United States Patent
Krishnaswamy et al.

(10) Patent No.: US 11,093,493 B1
(45) Date of Patent: Aug. 17, 2021

(54) DYNAMICALLY SWITCHING BETWEEN QUERY AND SCAN FOR OPTIMIZING TABLE READS

(71) Applicant: Amazon Technologies, Inc., Seattle, WA (US)

(72) Inventors: Shashanka Krishnaswamy, Seattle, WA (US); Surya Prakash Dhoolam, Mill Creek, WA (US); Bradley Nathaniel Burkett, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 314 days.

(21) Appl. No.: 16/147,494

(22) Filed: Sep. 28, 2018

(51) Int. Cl.
*G06F 7/00* (2006.01)
*G06F 17/30* (2006.01)
*G06F 16/2453* (2019.01)
*G06F 16/22* (2019.01)
*G06F 16/2458* (2019.01)

(52) U.S. Cl.
CPC ...... *G06F 16/2453* (2019.01); *G06F 16/2282* (2019.01); *G06F 16/2471* (2019.01)

(58) Field of Classification Search
CPC ............. G06F 16/2453; G06F 16/2282; G06F 16/2471
USPC ........................................................ 707/741
See application file for complete search history.

(56) References Cited

U.S. PATENT DOCUMENTS

| | | | |
|---|---|---|---|
| 8,443,002 B2 | 5/2013 | Chandrasekar et al. | |
| 8,706,715 B2 | 4/2014 | Eidson et al. | |
| 8,909,624 B2 | 12/2014 | Gannu et al. | |
| 9,143,534 B1* | 9/2015 | Kelliher | H04W 4/14 |
| 10,061,823 B2 | 8/2018 | Bruce et al. | |
| 10,067,979 B2 | 9/2018 | Agrawal et al. | |
| 2008/0162622 A1* | 7/2008 | Becker | G06F 16/25 709/201 |
| 2010/0088335 A1* | 4/2010 | Mimatsu | H04L 67/1097 707/770 |
| 2011/0040744 A1* | 2/2011 | Haas | G06F 16/24532 707/713 |
| 2011/0246449 A1* | 10/2011 | Collins | G06F 16/24542 707/715 |
| 2012/0011127 A1* | 1/2012 | Kim | G06F 16/2282 707/743 |
| 2014/0101132 A1* | 4/2014 | Konik | G06F 16/242 707/718 |

(Continued)

*Primary Examiner* — Binh V Ho

(74) *Attorney, Agent, or Firm* — Robert C. Kowert; Kowert, Hood, Munyon, Rankin & Goetzel, P.C.

(57) ABSTRACT

Various embodiments of dynamically switching between query and scan for optimizing table reads are described. A particular client of a shared table can use various criteria in determining whether to query for individual entries in a table, or whether to scan the entire table. Criteria can be, in some embodiments, whether there are fewer than a threshold number of other clients accessing the same portion of the table as the particular client, or the size of the portion accessed by the client. If there are fewer than a threshold number of other clients accessing the same portion of the table, and the size of the portion is below a size threshold, for example, then querying individual entries in the table might be appropriate in those circumstances. By querying instead of scanning, for example, clients can reduce the total number of I/O operations per second on the shared table.

20 Claims, 10 Drawing Sheets

(56) References Cited

U.S. PATENT DOCUMENTS

| | | | | |
|---|---|---|---|---|
| 2014/0188845 A1* | 7/2014 | Ah-Soon | ............... | G06F 16/256 707/722 |
| 2015/0142749 A1* | 5/2015 | Broll | ..................... | G06F 16/113 707/654 |
| 2016/0217183 A1* | 7/2016 | Konik | ................. | G06F 16/2393 |
| 2017/0177658 A1* | 6/2017 | Lee | ..................... | G06F 11/1451 |
| 2017/0193047 A1* | 7/2017 | Agrawal | ........... | G06F 16/24545 |
| 2017/0277687 A1* | 9/2017 | Sammis | .................. | G06F 16/93 |
| 2018/0173736 A1* | 6/2018 | Watanabe | ............ | G06F 16/2272 |
| 2018/0218041 A1* | 8/2018 | Arthanarisamy | ............................ | G06F 16/24542 |
| 2018/0365299 A1* | 12/2018 | Bruce | ..................... | G06F 16/20 |
| 2019/0102450 A1* | 4/2019 | Liu | ..................... | G06F 16/2455 |
| 2019/0147087 A1* | 5/2019 | Mart | .................. | G06F 16/2454 707/713 |
| 2019/0265713 A1* | 8/2019 | Zhou | ................... | G05D 1/0088 |
| 2019/0311052 A1* | 10/2019 | Mueller | ............. | G06F 9/44594 |
| 2020/0012645 A1* | 1/2020 | Collins | ............... | G06F 16/2462 |

* cited by examiner

DYNAMICALLY SWITCHING BETWEEN QUERY AND SCAN FOR OPTIMIZING TABLE READS

BACKGROUND

Shared tables managing large amounts of data on behalf of users may receive a high volume of request traffic to access data and to manage the storage of data. Different mechanisms for structuring, arranging, or otherwise making data available may be implemented in order to service requests. Shared tables offer a host of advantages to users. However, coordination problems between various clients of shared tables can, for example, occur, especially when operating on a common or shared set of data in a table. One way to overcome coordination problems is to implement a lock-based system where only one client at a time may operate on a portion of the data. However, such lock-based systems may undesirably slow operations performed upon the data. Additionally, such lock-based systems may become increasingly complex as additional nodes are added to the system.

Sometimes shared tables are used to coordinate activities. Clients can co-ordinate with each other using a shared table, or a shared portion of a table. Clients can periodically scan a shared table in order to learn of all the entries in the shared table, in order to determine what issues or activities other workers are addressing, and what issues or activities still need to be addressed. However, scanning a table in order to coordinate activities can result in multiple scans per minute on average per client. If the table is large, since, for example, it might contain information pertaining to many clients, then every scan on the shared table becomes expensive. The provisioned read I/O Operations per second ("TOPS") for the shared table might grow in proportion to number of entries in the table, and the number of clients performing the scans. This can be referred to as quadratic growth problem. The asymptotic complexity of reading the shared table can therefore be O(W*L) where W is the number of workers and L is the number of entries in the shared tables. Therefore, approaches to reduce the read TOPS on shared tables is needed.

Figure 1:
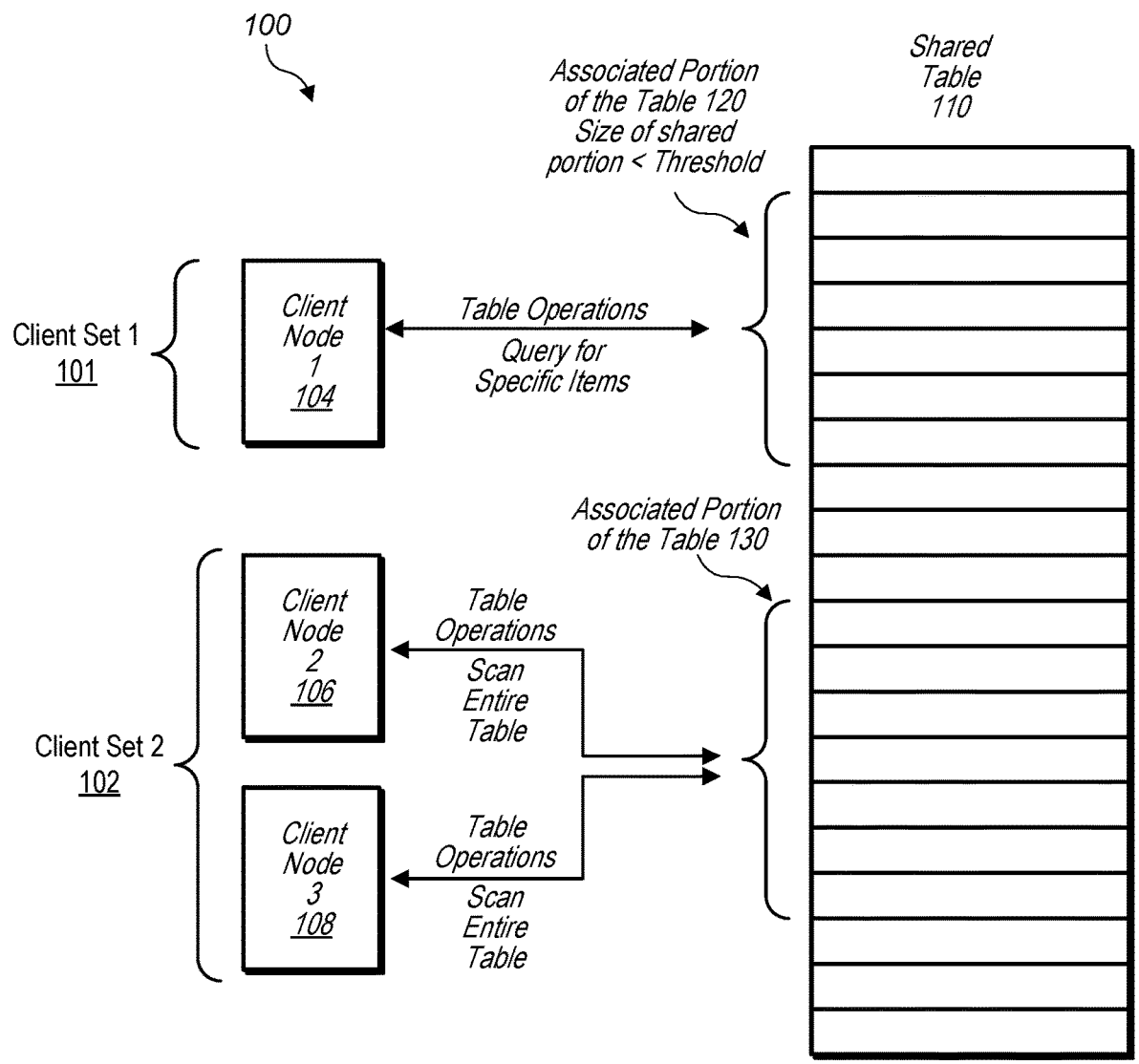
FIG. 1 illustrates a system that comprises multiple sets of clients performing table operations on associated portions of a shared table, where client set 1 performs queries instead of a scan, according to some embodiments.

In the following sections, reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments of apparatuses and methods for dynamically switching between query and scan for optimizing table reads are described. A particular client of a shared table can use various criteria in determining whether to query for individual entries in a table, or whether to scan the entire table. One criteria might be, in some embodiments, whether there are other clients accessing the same portion of the data as the particular client. If there are other clients, then those other clients might add, delete, or change relevant data in the associated portion of the table, for example. Another criteria might be, in some embodiments, whether there are fewer than a threshold number of other clients accessing the same portion of the data as the particular client. Another criteria might be, in some embodiments, the size of the portion of the table accessed by the client in relation to the size of the entire table. If the size of the associated portion of the table is large, and the size of the table as a whole is small, then querying the entries in the associated portion might take more computations or IOPS than scanning the table. Therefore, scanning the table might be more appropriate in these circumstances, for example. However, if there are no other clients are accessing the same associated portion of the table as the particular client, or of there are fewer than a threshold number of other clients accessing the same associated portion of the table, and that portion is small enough compared the table as a whole, for example, then querying individual entries in the table might be appropriate in those circumstances.

By querying instead of scanning, clients can reduce the number of accesses to a shared table, such as a shared database table, thus reducing the number of total TOPS from all clients in accessing the shared table. For example, if a table is large, then every scan on the shared table becomes expensive. The provisioned read TOPS for the shared table might grow in proportion to number of entries in the table, and the number of clients performing the scans of the table. This can be referred to as quadratic growth problem. The asymptotic complexity of reading the shared table can therefore be O(W*L) where W is the number of workers and L is the number of entries in the shared table. However, by querying for individual items in the table, then the number of TOPS for the shared table can be reduced.

Each client that is accessing the table might only be concerned with specific information in the table, based on the data in the table. For example, a client might only be concerned with entries in the table that correspond to a specific application, or to a specific region, or a specific customer, or a specific address. A client might be concerned with any number of other different criteria, or combination of criteria. When the client first accesses the table, in some embodiments, the client can scan the entire table and make note of all the entries in the table that are relevant to the specific criteria or combination of criteria that the client is concerned with. These entries might be the client's portion of the table, in some embodiments, since these are the entries that the client is concerned with. The client can note these entries and store representations of them in its own internal memory or cache, for example. Then, if the client determines that querying the table is more appropriate than scanning the table, the client can query the table only for those specific relevant entries that it noted in its initial scan. The client can use the information in its internal memory or cache, for example, so that the specific entry in the table can be quickly found.

The entries in the table might note which client or clients those entries correspond with, in some embodiments. When the client initially scans the table for entries that are relevant to the specific criteria or combination of criteria that the client is concerned with, the client can note which other clients correspond to those entries, if any. The client can add its identifying information to all or some of the relevant entries, in some embodiments. The client might remove the identifying information of another client, and add its identifying information to some of the relevant entries, in some embodiments. These entries might correspond to specific items or resources that the client will take ownership, or control, or processing of, in some embodiments. Using the information in the table about which client or clients entries in the table correspond with, the client can determine if, and how many, other clients are associated with the entries that it considers relevant.

The client might add entries to the table that are relevant to the client, in some embodiments. This can occur, in some of these embodiments, when the client discovers no entries in the table that are relevant to its specific criteria or combination of criteria. This can also occur if the client does discover other relevant entries, but for some reason needs to add additional entries. When the client adds entries to the table, it can note in those entries its own identifying information, so that other clients know it is associated with those entries, in some embodiments.

A client might decide to query the shared table in the future based on information it discovered in its initial scan of the table, in some embodiments. If the client determines that no other client is associated with entries it considers relevant, then the client might decide to query the shared table in the future for those relevant entries, instead of scanning the entire table. In other embodiments, if the client determines that fewer than a threshold number of other clients are associated with entries it considers relevant, then the client might decide to query the shared table in the future for those relevant entries, instead of scanning the entire shared table. The client might decide to do this because scanning the table would encompass those entries that are not relevant, and thus potentially waste processing power of the system or systems hosting the table. In some of these embodiments, the client can be guaranteed that no new relevant entry would be added to the table, since it is the only client associated with the relevant entries in the table.

If there are other clients associated with the relevant entries in the table, then there might be some other mechanism such that the client is guaranteed that no new relevant entry would be added to the table without it knowing about it. Therefore, the client might determine that only a limited number of other clients, such as below a threshold, are associated with entries it considers relevant, and decide to query the table in the future for those relevant entries. Or the client might determine that there are many other clients are associated with entries it considers relevant, and still decide to query the table for those relevant entries instead of scanning. A client might do this, in some embodiments, because there is another mechanism for the client to discover whether new relevant entries have been added to the table. This other mechanism, might be, in some embodiments, a message passing interface or other communication protocol among the clients, such that when a client adds a new relevant entry to the table, it informs all the other clients associated with the relevant entries that a new entry has been added. The mechanism might also be a manager, such as a client set membership manager, that might keep track of what entries in the table are associated with each client set and/or what clients are associated with each client set. The individual clients might report which entries in the table they are associated with to this client set membership manager, for example. There are many other types of mechanisms for a client to discover other relevant entries in the shared table, and the examples described here should not be construed as limiting.

Else, or in addition, the client might decide to query the table if the number of relevant entries is small, or below a threshold, in some embodiments. This amount or quantity of relevant entries might be in comparison to the size of the table as a whole, in some of these embodiments. The client might determine that the percentage of relevant entries to the table as a whole is such that querying those entries is less expensive or costly in terms of computing resources consumed, than scanning the entire table. For example, the client might determine the IOPS of scanning the entire table and compare that to the IOPS of querying each relevant entry in the table, and decide to implement whichever method produces the lower amount of IOPS. Else the client might simply have a pre-set threshold, such that if the number of relevant entries is less than the threshold, then the client will query the table for those entries, instead of scanning the entire table, in the future. Or the client might have a pre-set percentage, such that if the percentage of relevant entries to the total entries of the table is less than a certain percentage, then the client will query the table for those entries, instead of scanning the entire table, in the future. There can be many other kinds of methods or criteria used where the client basically determines the size, or another related parameter, of the relevant portion of the table. The examples described here should not be construed as limiting.

When a new client accesses the table, it might determine that it wants to be associated with entries relevant to the initial client, in some embodiments. The new client might determine or be assigned the responsibility of sharing the load of the relevant entries, for example. The relevant entries might correspond to specific items or resources that the client will process, or take ownership, or control of, in some embodiments. When the new client wants to be associated with some of, or all of, the entries relevant to the initial client, the new client will add its identifying information to some of, or all of, those entries. The new client might remove the identifying information of the initial client, and replace it with its own identifying information, in some embodiments.

If the initial client has decided to query entries in the table, instead of scanning the entire table, and the initial client then queries those entries, the initial client will discover that there is another client associated with some or all of the relevant entries. The initial client will be able to see the identifying information of the new client as part of or associated with some or all of the relevant entries. When the initial client determines that there is another client associated with some or all of the relevant entries, this might affect the initial client's determination of whether to scan or query the table. For example, the initial client might decide stop querying the table for the relevant entries, and start scanning the entire table, in some embodiments. This might be because the initial client is concerned that new client might add new relevant entries to the table, and the initial client wants to know about all the relevant entries in the table. The initial client would not be able to discover any new relevant entries by simply querying the previously existing relevant entries. Therefore, the initial client might decide to start scanning the entire table so that it can discover any new relevant entries.

A client might also switch between querying and scanning the table based on the changing size of the table, or the changing size of the particular portion of the table, for example. This particular portion of the table might be all the relevant entries of the table, no matter if the client is associated with the relevant entries or if another client is associated with those relevant entries, in some embodiments. Or the particular portion might be only those relevant entries with which the client is associated, either solely or in combination with other clients. Or the particular portion might be only those relevant entries with which the client is solely associated with, in other embodiments. In some embodiments, if the size of the particular portion of the table associated with the client becomes greater than a certain amount or percentage, such as threshold, then the client might stop querying the table and start scanning the table. On the other hand, if the size of the particular portion of the table associated with the client becomes less than a certain amount or percentage, such as threshold, then the client might stop scanning the table and start querying the table. Conversely, if the size of the table as a whole becomes greater than a certain amount or percentage, such as threshold, then the client might stop scanning the table and start querying the table. Else, if the size of the table as a whole becomes less than a certain amount or percentage, such as threshold, then the client might stop querying the table and start scanning the table.

In some embodiments, dynamically switching between query and scan for optimizing table reads can be applicable to stream processing. For example, producers of data streams continually push data to the stream. For example, a web server sending log data to a stream is a producer. Consumers use the data, either in real time or not. Consumers (such as a custom application) can process the data and store their results into a storage system. A data stream is comprised of data records. A data record can be the unit of data stored in a data stream. Data records can be composed of, in some embodiments, a sequence number, a partition key, and a data blob, which can be an immutable sequence of bytes. Data streams may not inspect, interpret, or change the data in the blob in any way, in some embodiments. A data blob can be up to 1 MB, in some embodiments.

A data stream can be composed of a set of partitions that might also be called shards, in some embodiments. A shard can be a uniquely identified sequence of data records in a stream, in some of these embodiments. Each shard can have a sequence of data records, in some embodiments. Each data record can have a sequence number that can be assigned by the data stream environment, in some embodiments. Each data record might have a sequence number that is unique within its shard, in some embodiments. The data stream environment can assign the sequence number after data is written to the stream by a producer, for example. Sequence numbers for the same partition key generally increase over time.

A stream might be composed of one or more shards, each of which provides a fixed unit of capacity. In some embodiments, each shard can support up to 5 transactions per second for reads, up to a maximum total data read rate of 2 MB per second and up to 1,000 records per second for writes, up to a maximum total data write rate of 1 MB per second. Other embodiments can support other values for these parameters. The data capacity of a stream can be a function of the number of shards that for the stream. The total capacity of the stream might be the sum of the capacities of its shards, for example.

A partition key can be used to group data by shard within a stream. The data stream environment can segregate the data records belonging to a stream into multiple shards. It can use the partition key that is associated with each data record to determine which shard a given data record belongs to. Partition keys can be Unicode strings with a maximum length limit of 256 bytes, in some embodiments. An MD5 hash function can be used to map partition keys to 128-bit integer values and to map associated data records to shards, in some embodiments. When an application puts data into a stream, it must specify a partition key, in some embodiments.

In some stream processing systems, multiple stream processing workers coordinate with each other using a shared table. The entries in the shared table can be called leases. Each lease might be associated with a single shard of a data stream. Multiple leases belonging to multiple streams can be located in a single shared table. Each entry in the table can contain information about the owner, last processed time, and checkpoint of the shard, in some embodiments. The table allows the stream processing workers to discover and track shards within a stream, in some embodiments. This allows multiple stream processing workers to process the shards in a stream, in these embodiments. Stream processing workers can periodically scan the shared table to get all the leases for the stream, and also (1) find the leases that currently have no owners or are expired and try to acquire them, (2) renew the leases that are currently being processed, and (3) cleanup the leases that no longer have corresponding active shards.

A stream processing worker might examine the stream or streams that it is processing, and determine the active shards of the stream, as well as other information about the stream. A stream processing worker might find all active shards in the stream and create leases in the shared table for each shard, if a lease is not already present in the table. The scan operation of the table enables the stream processing workers to identify all the shards which are currently present in the table, so that new active shards which don't yet have lease entries in the shared table can be identified from the shards in the stream. These new shards can be added to the table as new leases.

However, these stream processing workers might require multiple scans per minute of the table to accomplish these tasks, in some embodiments. In addition, leases belonging to multiple streams might be located in a single shared table. Therefore, every scan on the shared table can be expensive. The provisioned read IOPS for a shared table can grow in proportion to the number of streams, the number stream processing workers, and number of leases in the table. This is an example of the quadratic growth problem. The asymptotic complexity of reading the shared table can therefore be $O(W*L)$, where W is the number of stream processing workers and L is the number of leases, or entries, in the shared table.

In order to reduce the read IOPS for the shared table, stream processing workers might query the shared table, instead of scanning the shared table, in certain situations. In order to accomplish this, the stream processing workers can maintain an in-memory Lease Key Cache containing shard IDs of all the shards for the streams that the stream processing worker is processing, in some embodiments. The stream processing worker might switch to querying the shared table for streams that are being processed by only one stream processing worker, and have less than or equal to 10 shards, in some embodiments.

In order to successfully accomplish querying the table, the stream processing worker can, in some embodiments, get the list of shards being tracked by scanning the shared lease table during the initialization, and adding shard IDs to the Lease Key Cache. Scanning the shared lease table during worker initialization also allows the stream processing worker to clean stale lease entries. Scanning ensures that the stream processing worker gets all the leases pertaining to the stream being processed in the lease table, including entries corresponding to stale leases that need cleaning up. Scanning the shared lease table also allows the stream processing worker to initialize the Lease Key Cache with only shards that are actively being processed. If a stream processing worker only examined the stream or streams that it is processing in order to determine the active shards of the stream, and did not scan the shared lease table upon initialization, the stream processing worker would include shard IDs that are already processed in its Lease Key Cache. Querying all these shards in shared lease table would then be wasteful, and might remove all the advantages of querying to begin with.

In order to successfully accomplish querying the table, the stream processing worker can also remove the shard IDs from the Lease Key Cache for shards that are done being processed or tracked, in some embodiments. In addition, the stream processing worker can add shard IDs to the Lease Key Cache for new shards that are discovered by examining the stream or streams that it is processing, in some of these embodiments. The stream processing worker can then use the shard IDs from its Lease Key Cache to query the lease table instead of scanning the entire table, thereby removing the expensive scan operation.

During operation, the stream processing worker can also periodically check to see if there is more than one stream processing worker processing the stream, or if there are more than a threshold number of shards for the stream, for example. This threshold number can be 10 in some embodiments. In this case, the stream processing worker can switch from querying the shared lease table to scanning the table. In other embodiments, the stream processing worker might check to see if there is more than a threshold number of stream processing workers processing the stream. If there are more than a threshold number of stream processing workers processing the stream, in these embodiments, then the stream processing worker can switch from querying the shared lease table to scanning the table. In some of these or other embodiments, the stream processing worker can also check to see if number of shards is at or below the threshold number, in which case the stream processing worker can switch to querying the shared lease table. The stream processing worker might also determine if there is only one stream processing worker, or less than a threshold number of stream processing workers, processing the stream, depending on the embodiment.

In some embodiments, the stream processing workers might only scan the shared table, and not query to the shared table, for those streams where multiple stream processing workers are processing shards in the stream, or greater than a threshold number of stream processing workers are processing shards in the stream, depending on the embodiment. This can be to avoid delay in discovering new shards to be processed. For example, a stream might be being processed by two stream processing workers. Stream processing worker 1 might examine the stream or streams that it is processing, determine the active shards of the stream, create leases in the table corresponding to those active shards, and start processing. Then stream processing worker 2 might, after few seconds, examine the same stream or streams, and determine the active shards of that stream or streams. However, the stream or streams might have been re-sharded during this time, and/or there might be new shards that were not seen by stream processing worker 1. Stream processing worker 2 would now add leases to the table corresponding to these new shards. Stream processing worker 2 might then die, or be terminated due a downscale operation, for example. Therefore, if stream processing worker 1 is only querying the shared table, and not scanning the shared table, then stream processing worker 1 will not be aware of the new leases added to the table by stream processing worker 2 until it reexamines the stream or streams that it is processing again, in order to determine the active shards of the stream. Stream processing worker 1 might only reexamine the stream or streams very rarely. Stream processing worker 1 might only reexamine the stream or streams upon completing processing the shards that the stream processing worker 1 is associated with. This could be on the order of one to several days, in some embodiments. Therefore, if stream processing worker 1 only queries and does not scan the table when there are multiple stream processing workers processing shards of the same data stream, then new shards might go unprocessed for several days.

In some embodiments, there might be a Lease Manager that performs some of these operations. The Lease Manager might own or maintain the lease key cache. In these embodiments, it can decide whether to use/maintain lease key cache based on the number of stream processing worker processing the streams for an application, the existence of a shared lease table, and the number of shards in the stream or streams. The Lease Manager can switch from query to scan mode, and vice versa, based on the number of active stream processing workers processing the stream or streams, and the number of shards in the stream or streams. A Lease Taker process or functionality might send number of stream processing workers for an application to the Lease Manager.

The predicted improvement in read IOPS can be calculated, in some embodiments, of a system where stream processing workers implement a query of the shared lease table, instead of a scan, under certain conditions. One can compute the improvement in read IOPS of a table with L leases, that is scanned or used by K stream processing workers, where the capacity consumed by a scan of the shared lease table is be Cs. The performance improvement would be the old IOPS consumption divided by the new IOPS consumption. The old IOPS consumption can be calculated by the number of stream processing workers accessing the table (K) multiplied by the IOPS consumed by a scan of the shared lease table (Cs). The new IOPS consumption would be the number of stream processing workers performing a scan under the new system multiplied by the IOPS consumed by a scan of the shared lease table (Cs), added to the number of stream processing workers doing a query of the shared lease table under the new system multiplied by the average number of leases handled for each stream processing worker performing a query of the shared lease table, multiplied by the IOPS consumed by a query of an entry of the shared lease table. For example, if ~83% of streams processed are processed by a single stream processing workers, and are streams that have less than 10 shards (for an average of 5 shards per stream for these streams), and if each query consumes one IOPS, then the performance improvement formula becomes:

$$\text{Performance Improvement} = K^*Cs/((0.17^*K^*Cs) + (0.83^*K^*5^*1))$$

As a further example, if a shared lease table has 20,000 lease entries (L), and has 7000 stream processing workers (K), where the IOPS consumed by a scan of the shared lease table (Cs) is around 130, then the performance improvement becomes 910,000/(154,700+29,050)=around 5.0× improvement in the number of IOPS of the shared lease table using the query method. Other values for these parameters would yield different performance improvements.

Embodiments of Dynamically Switching Between Query and Scan for Optimizing Table Reads FIG. 1 illustrates a system that comprises multiple sets of clients performing table operations on associated portions of a shared table, where client set 1 performs queries instead of a scan, according to some embodiments. In FIG. 1, client node 1 104 is the only client node in client set 1 101. Client set 2 102, however, comprises two client nodes, client node 2 106, and client node 3 108. Client set 1 101 operates on an associated portion 120 of the shared table 110. Client set 2 operates on a different associated portion 130 of the shared table 110. The associated portions of the shared table, 120 and 130, can comprise multiple entries of the shared table 110. While the associated portions, 120 and 130, are depicted as being contiguous entries, this is only for ease of presenting the figure. The associated portions, 120 and 130, can comprise non-contiguous table entries, in some embodiments, such that the entries are spread throughout the shared table, and are not a block of entries in one section of the shared table as depicted in FIG. 1. The associated portions of the shared table, 120 and 130, might be exclusive of one another, such that no entries in one associated portion appear in the other associated portion, in some embodiments. In other embodiments the associated portions of the shared table 120 and 130 might include some entries in common.

Each client 104, 106, and 108 that is accessing the shared table is only be concerned with specific entries in the shared table, based on the data in the shared table, in some embodiments. Client node 104 in client set 101 is only concerned with the entries in associated portion of the shared table 120. Client nodes 106 and 108 of client set 2 is only concerned with the entries in the associated portion of the shared table 130. In the figure, client node 1 has determined that querying the shared table is more appropriate than scanning the shared table. Therefore, client node 1 104 queries the shared table 110 only for those specific relevant entries in its associated portion of the shared table 120. Client node 1 104 can use the information in its internal memory or cache, for example, so that the specific entry in the shared table can be quickly found, in some embodiments.

Client node 1 104 has decided to query the shared table for those specific relevant entries in its associated portion of the shared table 120, instead of scanning the entire shared table 110. Client node 1 104 has determined that no other client is associated with the entries in its associated portion of the shared table 120. In the embodiments shown in this figure, the client might be determining whether fewer than a threshold number of clients are accessing its associated portion of the shared table 120, where the threshold number is 2. This is the same as the client determining that less than or equal to a threshold number of clients are accessing its associated portion of the shared table 120, where the threshold number is 1.

Client node 1 has also determined that the number of entries in its associated portion 120 of the shared table is less than a certain portion size threshold. This amount or quantity of relevant entries might be in comparison to the size of the shared table as a whole, in some embodiments. For example, client node 1 might have determined that the percentage of entries in its associated portion 120, as compared to the entries in the shared table 110 as a whole is such that querying those entries is less expensive or costly in terms of computing resources consumed, than scanning the entire shared table, in some embodiments. For example, client node 1 might have determined that the IOPS of scanning the entire shared table and compared that to the IOPS of querying each relevant entry in the shared table, and decided to implement querying the shared table, since that produces the lower amount of IOPS. Else client node 1 might simply have a pre-set threshold, such that if the number of relevant entries is less than the threshold, then client node 1 will query the shared table for those entries, instead of scanning the entire shared table, in the future. Or client node 1 might have a pre-set percentage, such that if the percentage of entries in the associated portion to the total entries of the shared table is less than a certain percentage, then client node 1 would query the shared table for those entries, instead of scanning the entire shared table, in the future. There can be many other kinds of methods or criteria used where client node 1 basically determines the size, or another related parameter, of its associated portion of the shared table 120. The examples described here should not be construed as limiting.

Client nodes 2 and 3, 106 and 108, have each determined that there is another client node associated with, or accessing, the portion 130 of the shared table associated with itself, in the embodiments depicted by FIG. 1. In the embodiments shown in this figure, a threshold value of clients accessing the portion 130 would be either less than 2 or less than or equal to 1 (both of which are the same). Based on this determination, each client node has decided to scan the entire shared table 110, instead of querying for individual entries in its associated portion 130 of the shared table, in these depicted embodiments. It does not matter if the size of the associated portion 130 of the shared table is greater than or less than a threshold, in these embodiments, since the criteria of being the only client node accessing the associated portion was not satisfied. Since this criteria of being the only client node accessing the associated portion 130 of the shared table is not satisfied for the nodes of client set 2 102, the size of the associated portion 130 becomes irrelevant to the determination of whether to query or scan, in these embodiments.

Figure 2:
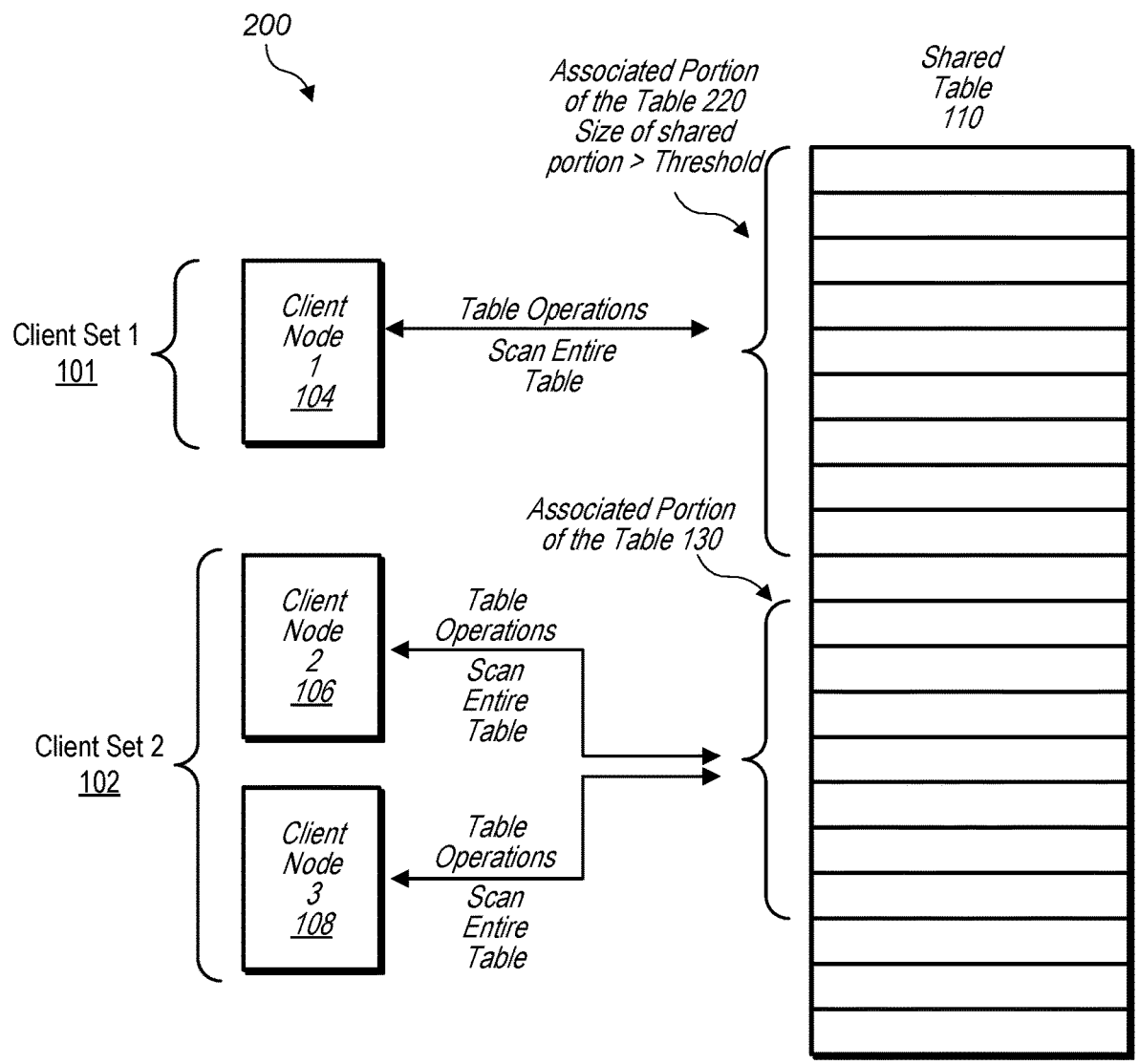
FIG. 2 illustrates a system that comprises multiple sets of clients performing table operations on associated portions of a shared table, where client sets 1 and 2 perform scans instead of a queries, according to some embodiments.

FIG. 2, is similar to FIG. 1, and illustrates a system that comprises multiple sets of clients performing table operations on associated portions of a shared table, where client sets 1 and 2 both perform scans instead of a queries, according to some embodiments. In the embodiments depicted by FIG. 2, client node 1 has determined that the number of entries in its associated portion 220 of the shared table is greater than a certain portion size threshold. This amount or quantity of relevant entries might be in comparison to the size of the shared table as a whole, in some embodiments. Based on this determination, client node 104 has decided to scan the entire shared table 110, instead of querying for individual entries in its associated portion 220 of the shared table, in these depicted embodiments. It does not matter the criteria of being the only client node accessing the associated portion was satisfied in these embodiments, because the size of the associated portion 220 of the shared table was greater than a threshold. Since this criteria of the size of the associated portion 220 of the shared table being less than a threshold was not satisfied for client node 1 104, whether or not it is the only client node accessing the associated portion 220 of the shared table becomes irrelevant to the determination of whether to query or scan, in these embodiments.

For example, client node 1 104 might have determined that the percentage of entries in its associated portion 220, as compared to the entries in the shared table 110 as a whole is such that querying those entries is more expensive or costly in terms of computing resources consumed, than scanning the entire shared table, in some embodiments. For example, client node 1 might have determined that the IOPS of scanning the entire shared table and compared that to the IOPS of querying each entry in its associated portion 220 in the shared table, and decided to implement scanning the shared table, since that produces the lower amount of IOPS. Else client node 1 might simply have a pre-set threshold, such that if the number of relevant entries is greater than the threshold, then client node 1 will scan the entire shared table, instead of querying the shared table for those entries in the future. Or client node 1 might have a pre-set percentage, such that if the percentage of entries in the associated portion to the total entries of the shared table is greater than a certain percentage, then client node 1 would scan the entire shared table, instead of querying the shared table for those entries. There can be many other kinds of methods or criteria used where client node 1 basically determines the size, or another related parameter, of its associated portion of the shared table 120. The examples described here should not be construed as limiting.

In the embodiments depicted by FIG. 2, client node 1 might later determine that the number of entries in its associated portion 220 of the shared table is less than a certain threshold. This amount or quantity of relevant entries might be in comparison to the size of the shared table as a whole, in some embodiments. Based on this determination, client node 104 might then decide to querying for individual entries in its associated portion 220 of the shared table, instead of scan the entire shared table 110, in these depicted embodiments. Therefore, the embodiments shown in FIG. 2 might transition to the embodiments shown in FIG. 1, if the number of entries in its associated portion 220 of the shared table goes from being greater than a certain portion size threshold, to less than the certain portion size threshold.

Client nodes 2 and 3, 106 and 108, have each continued to determine that there is another client node associated with, or accessing, the portion 130 of the shared table associated with itself, in the embodiments depicted by FIG. 2. Based on this determination, each client node has decided to scan the entire shared table 110, instead of querying for individual entries in its associated portion 130 of the shared table, in these depicted embodiments. It does not matter if the size of the associated portion 130 of the shared table is greater than or less than a threshold, in these embodiments, since the criteria of being the only client node accessing the associated portion was not satisfied. Since this criteria of being the only client node accessing the associated portion 130 of the shared table is not satisfied for the nodes of client set 2 102, the size of the associated portion 130 becomes irrelevant to the determination of whether to query or scan, in these embodiments.

Figure 3:
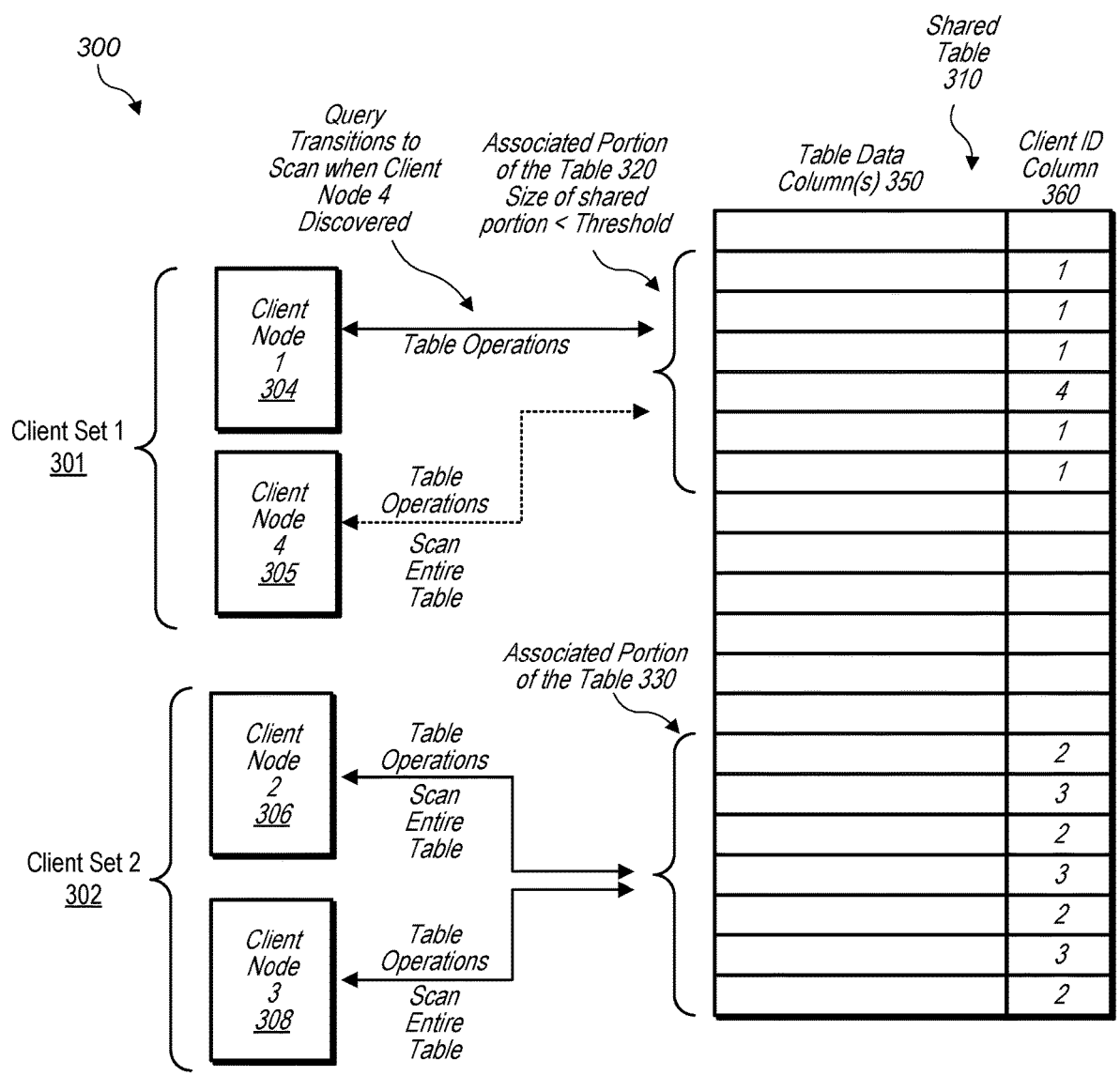
FIG. 3 illustrates a system that comprises multiple sets of clients performing table operations on associated portions of a shared table, where client node 1 of client set 1 transitions from performing queries to performing scans, according to some embodiments.

FIG. 3 illustrates a system that comprises multiple sets of clients performing table operations on associated portions of a shared table, where client node 1 of client set 1 transitions from performing queries to performing scans, according to some embodiments. In the embodiments depicted by FIG. 3, Client node 1 304 has initially decided to query the shared table for specific relevant entries in its associated portion of the shared table 320, instead of scanning the entire shared table 310. Client node 1 304 has determined that no other client is associated with the entries in its associated portion of the shared table 320. Client node 1 has also determined that the number of entries in its associated portion 320 of the shared table is less than a certain threshold. In the embodiments shown in this figure, the client might instead be determining whether fewer than a threshold number of clients are accessing its associated portion of the shared table 320, where the threshold number is 2. This is the same as the client determining that less than or equal to a threshold number of clients are accessing its associated portion of the shared table 320, where the threshold number is 1.

The shared table 310 comprises at least two sets of data, noted as two separate columns in FIG. 3. These columns are the table data column or columns 350 and the client identification column 360. The client identification column 360 notes the client node identification of the client node assigned or associated with that entry. For example the majority of the entries in the client identification column 360 for the associated portion 320 of the shared table 310 are for client node 1 304.

In the embodiments depicted by the scenario of FIG. 3, all the entries in the associated portion 320 of the shared table 310 initially had entries in the client identification column 360 that identified client node 1. Then new client node 4 305 attempts to accesses the shared table, and determines that it wants to be associated with the associated portion 320 of the shared table, in these embodiments. The new client node 4 305 might determine or be assigned the responsibility of sharing the load of the work associated with the entries in the associated portion 320, for example. The entries in the associated portion 320 might correspond to specific items or resources that a client will process, or take ownership, or control of, in some embodiments. When the new client 4 305 wants to be associated with some of, or all of, the entries relevant to the initial client, the new client will add its identifying information to some of, or all of, those entries. The new client 4 305 might remove the identifying information of the initial client, and replace it with its own identifying information, in some embodiments. In the embodiments depicted by FIG. 3, the new client node 4 305 has replaced the identifying information of client node 1 304 with its own identifying information in one entry of the associated portion 320 of the shared table 310.

Client node 1 304 has initially decided to query for individual entries in the associated portion 320 of the shared table 310, instead of scanning the entire shared table 310, and when client node 1 304 then queries those entries, client node 1 304 discovers that there is another client, client node 4 305 associated with some or all of the relevant entries. Client node 1 304 sees the identifying information of the client node 4 305 as part of or associated with some or all of the relevant entries. When client node 1 304 determines that there is another client associated with some or all of the relevant entries, this might affect client node 1 304's determination of whether to scan or query the shared table. For example, client node 1 304 might decide stop querying the shared table for the relevant entries, and start scanning the entire shared table, in some embodiments. This might be because client node 1 304 is concerned that client node 4 305 might add new relevant entries to the shared table, and the initial client wants to know about all the relevant entries in the shared table. Client node 1 304 would not be able to discover any new relevant entries by simply querying the previously existing relevant entries. Therefore, client node 1 304 might decide to start scanning the entire shared table so that it can discover any new relevant entries. In the embodiments depicted by FIG. 3, client node 1 304 has decide to start scanning the entire shared table, instead of querying for individual entries in the associated portion 320 of the shared table 310.

Figure 4:
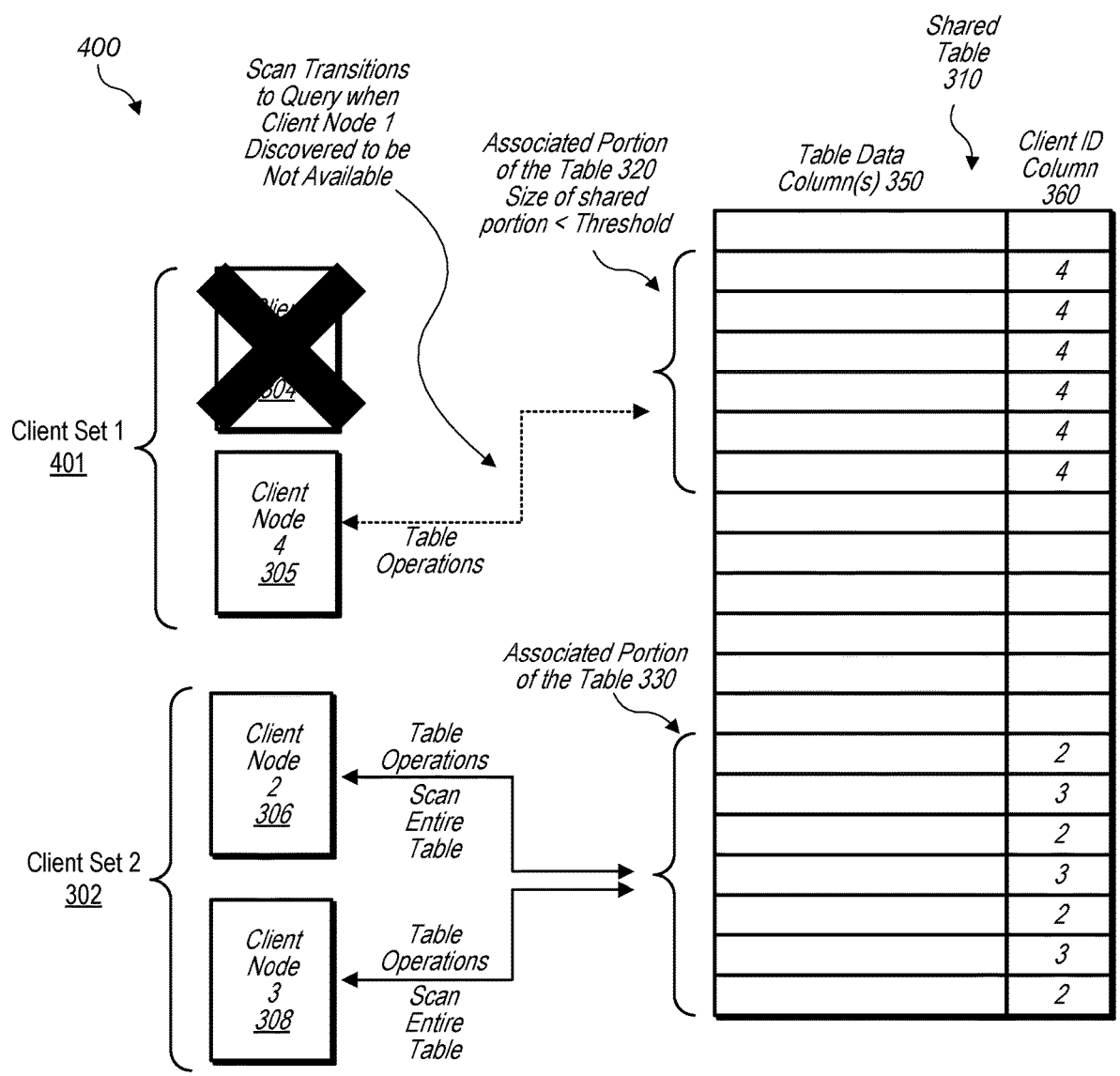
FIG. 4 illustrates a system that comprises multiple sets of clients performing table operations on associated portions of a shared table, where client node 4 of client set 1 transitions from performing scans to performing queries, according to some embodiments.

FIG. 4 illustrates a system that comprises multiple sets of clients performing table operations on associated portions of a shared table, where client node 4 of client set 1 transitions from performing scans to performing queries, according to some embodiments. Client node 4 305 has initially decided to scan the entire shared table 310, instead of querying for individual entries in the associated portion 320 of the shared table 310. However, when client node 4 305 then queries those entries, client node 4 305 discovers that there is no other client associated with some or all of the relevant entries. This might be because client 1 304 from FIG. 3 has become disconnected or terminated, for example. Client node 4 305 might discover that the other client nodes, such as client node 1 304, which were previously associated with some of those entries are no longer associated with those entries, since their client IDs might have been removed from the client ID column 360 associated with those entries, in some embodiments. In other embodiments, the table might include data that represents a "heartbeat" feature, where each client node must access their associated table entries, or update their associated table entries with time-based information. If table entries that were previously associated with the other client node, such as client node 1 304, have not been touched or "heartbeated", then client node 4 305 might determine that client node 1 has become disconnected or terminated, for example.

Client node 4 305 might determine that there is not timely identifying information of any other client node as part of or associated with some or all of the relevant entries, in some embodiments. In other embodiments, client node 4 305 might determine that there is less than a threshold number of other client nodes associated with some or all of the relevant entries, based on some information such as the "heartbeat" information in the shared table 310. When client node 4 305 determines that there is either no other, or less than a threshold number of, other clients associated with some or all of the relevant entries, this might affect client node 4 305's determination of whether to scan or query the shared table. For example, client node 4 305 might decide stop scanning the entire shared table, and start querying the shared table for the relevant entries, in some embodiments. This might be because client node 4 305 is no longer concerned that client node 1 304 might add new relevant entries to the shared table. Client node 4 305 would now be able to discover any new relevant entries by simply querying the previously existing relevant entries. Therefore, client node 4 305 might decide to start querying the shared table for the relevant entries, in order to save shared table IOPS. In the embodiments depicted by FIG. 4, client node 4 305 has decided to start querying for individual entries in the associated portion 320 of the shared table 310, instead of scanning the entire shared table.

Figure 5:
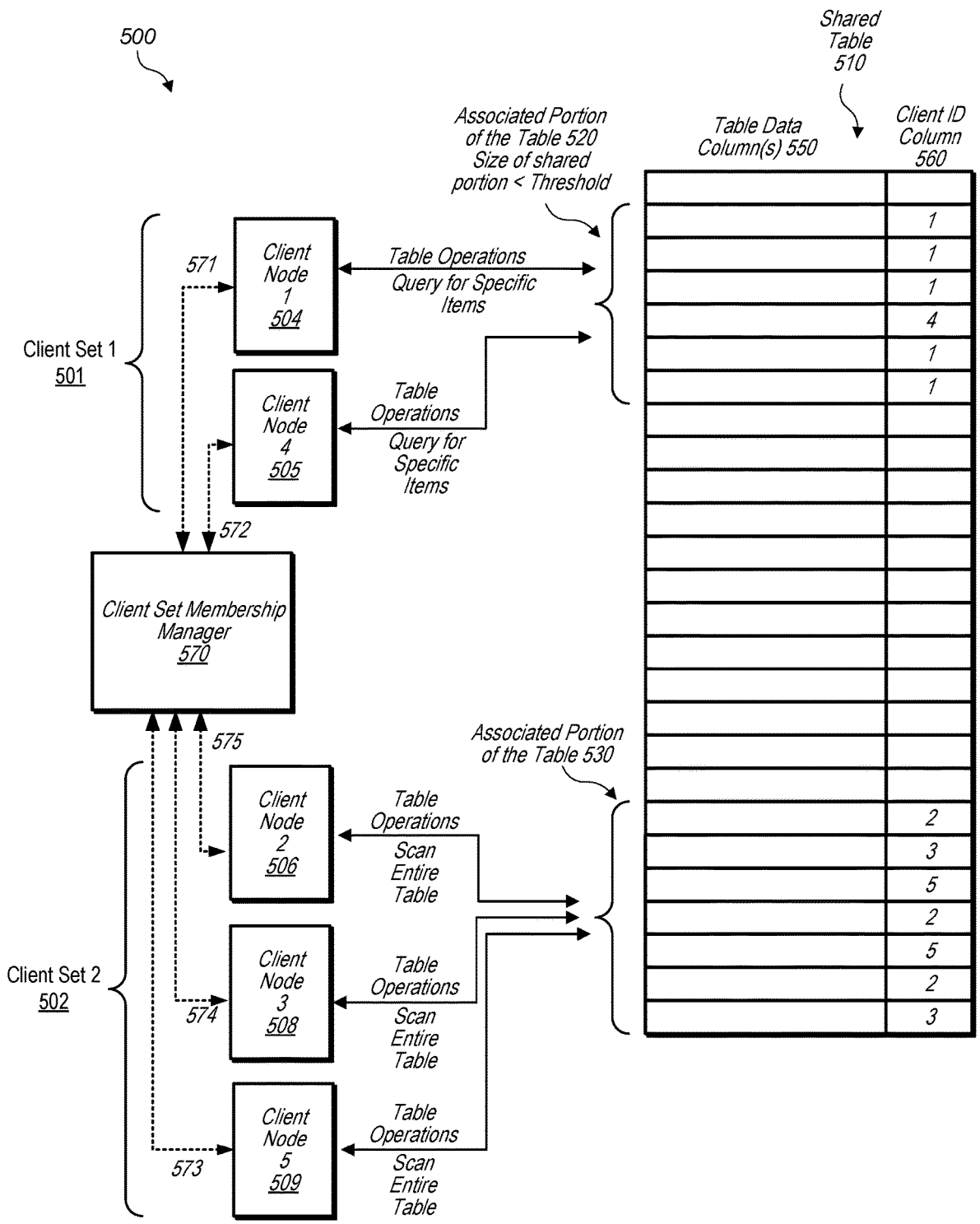
FIG. 5 illustrates a system that comprises multiple sets of clients performing table operations on associated portions of a shared table, where a client set membership manager maintains entries associated with each client set.

FIG. 5 illustrates a system that comprises multiple sets of clients performing table operations on associated portions of a shared table, where a client set membership manager maintains entries associated with each client set. In the embodiments depicted by FIG. 5, Client node 1 504 and client node 4 505 have initially decided to query the shared table for specific relevant entries in their associated portion of the shared table 520, instead of scanning the entire shared table 510. Client node 1 504 and client node 4 505 have determined that that fewer than a threshold number of client nodes are associated with the entries in their associated portion of the shared table 520. Client node 1 504 and client node 4 505 have also determined that the number of entries in their associated portion 520 of the shared table is less than a certain portion size threshold. In the embodiments shown in this figure, the clients might be determining whether fewer than a threshold number of clients are accessing its associated portion of the shared table 520, where the threshold number is 3. This is the same as the clients determining that less than or equal to a threshold number of clients are accessing its associated portion of the shared table 520, where the threshold number is 2.

The shared table 510 comprises at least two sets of data, noted as two separate columns in FIG. 5. These columns are the table data column or columns 550 and the client identification column 560. The client identification column 560 notes the client node identification of the client node assigned or associated with that entry. For example the majority of the entries in the client identification column 560 for the associated portion 520 of the shared table 510 are for client node 1 304. One entry in the client identification column 560 for the associated portion 520 of the shared table 510 is for client node 4 305.

Client nodes 2, 3, and 5, 506, 508, and 509 have each continued to determine that the number of client nodes associated with, or accessing, the associated portion 530 of the shared table is greater than a threshold, in the embodiments depicted by FIG. 5. Based on this determination, each of these client nodes has decided to scan the entire shared table 510, instead of querying for individual entries in its associated portion 530 of the shared table, in these depicted embodiments. It does not matter if the size of the associated portion 530 of the shared table is greater than or less than a portion size threshold, in these embodiments, since the criteria of the number of clients accessing or associated with the portion 530 is greater than a threshold. In the embodiments shown in this figure, the clients might be determining whether greater than a threshold number of clients are accessing its associated portion of the shared table 530, where the threshold number is 2. This is the same as the clients determining that less than or equal to a threshold number of clients are accessing its associated portion of the shared table 530, where the threshold number is 3. Since this criteria of fewer than a threshold number of clients accessing the associated portion 530 of the shared table is not satisfied for the nodes of client set 2 502, the size of the associated portion 530 becomes irrelevant to the determination of whether to query or scan, in these embodiments.

In the embodiments shown in FIG. 5, all client nodes communicate with a client set membership manager 570. Since there are other clients associated with the relevant entries in the table, in these embodiments depicted in FIG. 5, then there is a mechanism such that a client that is querying the table, such as client nodes 1 and 4 (504 and 505) are guaranteed that no new relevant entry would be added to the table without them knowing about it. Therefore, client nodes 1 and 4 (504 and 505) might determine that only a limited number of other clients, such as below a threshold of 3, are associated with their associated portion of the table 520, and decide to query the table in the future for those relevant entries. Client nodes 1 and 4 (504 and 505) do this, in some embodiments, because there is another mechanism for the client nodes to discover whether new relevant entries have been added to the table. This other mechanism, in the embodiments depicted in FIG. 5 is a client set membership manager 570. The client set membership manager 570 might keep track of what entries in the table are associated with each client set, such as client sets 1 and 2 (501 and 502) and/or what clients are associated with each client set.

The individual nodes communicate with the client set membership manager 570. Client node 1 communicates with the client set membership manager 570 through communication channel 571. Client node 4 communicates with the client set membership manager 570 through communication channel 572. Client node 2 communicates with the client set membership manager 570 through communication channel 575. Client node 3 communicates with the client set membership manager 570 through communication channel 574. Finally, client node 5 communicates with the client set membership manager 570 through communication channel 573. The individual clients nodes 1, 2, 3, 4, and 5 (504, 505, 506, 508, and 509 respectively) might report which entries in the table they are associated with to the client set membership manager 570, for example. Then the individual client nodes might query the client set membership manager 570 as to what entries in the shared table 510 are associated with their client set and/or what other clients are associated with their particular client set.

For example, client node 1 504 of client set 1 501 might query the client set membership manager 570 as to what entries in shared table 510 correspond to its associated portion 520 of the shared table. Else, or in addition to, the previous query, or combined with the previous query, client node 1 504 might query the client set membership manager 570, as to what other client nodes are associated with client set 1 501. Based on this information, client node 1 504 will decide whether to query the shared table for specific relevant entries in their associated portion of the shared table 520, or scan the entire shared table 510. In the embodiments depicted in FIG. 5, client node 1 504 has determined that that fewer than a threshold number of client nodes are associated with the entries in its associated portion of the shared table 520, and has therefore decided to query the shared table for specific relevant entries in its associated portion of the shared table 520, instead of scanning the entire shared table 510.

Figure 6:
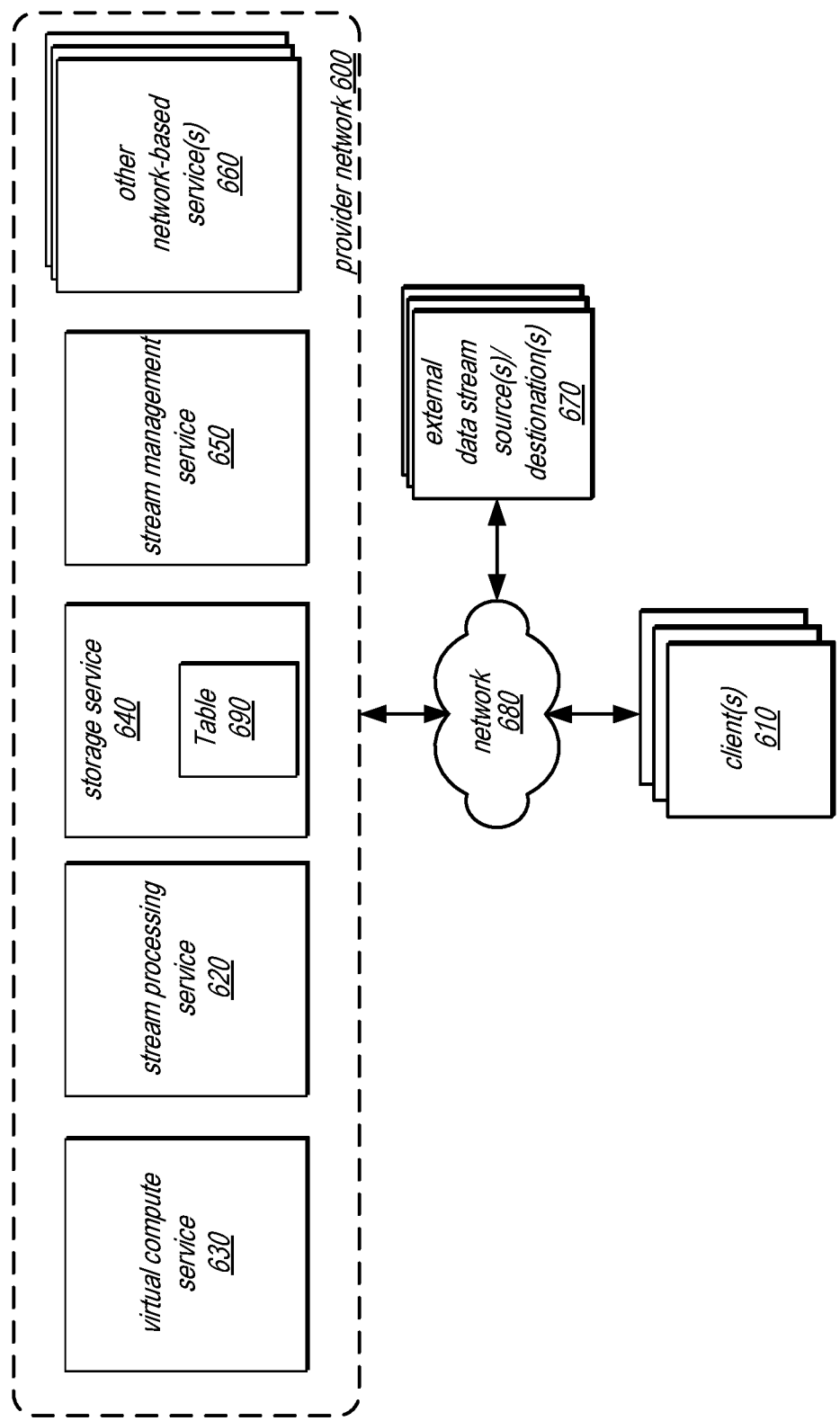
FIG. 6 is a logical block diagram illustrating a provider network that implements a stream management service that provides for dynamically switching between query and scan for optimizing table reads, according to at least some embodiments.

Dynamically Switching Between Query and Scan for Optimizing Table Reads in a Provider Network FIG. 6 is a logical block diagram illustrating a provider network that implements a stream management service that provides for dynamically switching between query and scan for optimizing table reads, according to at least some embodiments. Embodiments of a stream management service that provides for dynamically switching between query and scan for optimizing table reads apparatus and method are described that may be implemented on or by a provider network, in some embodiments, that communicates with a plurality of clients. In other embodiments a stream management service that provides for dynamically switching between query and scan for optimizing table reads apparatus and method may be implemented in enterprise networks or simple client-server networks, or any kind of network where a computer accesses a resource through a network.

The service provider network 600 may provide computing resources via one or more computing services to the client(s) 610. The service provider network 600 may be operated by an entity to provide one or more services, such as various types of cloud-based computing or storage services, accessible via the Internet and/or other networks to client(s) 610. In some embodiments, the service provider network 600 may implement a web server, for example hosting an e-commerce website. Service provider network 600 may include numerous data centers hosting various resource pools, such as collections of physical and/or virtualized computer servers, storage devices, networking equipment and the like, needed to implement and distribute the infrastructure and services offered by the service provider network 600. In some embodiments, service provider network 600 may employ computing resources for its provided services. These computing resources may in some embodiments be offered to client(s) 610 in units called "instances," such as virtual compute instances.

The client(s) 610 may encompass any type of client configurable to submit requests to the service provider network 600. For example, a given client 610 may include a suitable version of a web browser or may include a plug-in module or other type of code module configured to execute as an extension to or within an execution environment provided by a web browser. Alternatively, a client 610 may encompass a client application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, client(s) 610 may be configured to generate network-based services requests according to a Representational State Transfer (REST)-style network-based services architecture, a document- or message-based network-based services architecture, or another suitable network-based services architecture. In some embodiments, the service provider network 600 may offer its services as web services, and the client(s) 610 may invoke the web services via published interfaces for the web services. In some embodiments, a client 610 (e.g., a computational client) may be configured to provide access to a computing service 600 in a manner that is transparent to applications implemented on the client(s) 610 utilizing computational resources provided by the service provider network 600.

The client(s) 610 may convey network-based services requests to the service provider network 600 via network connection 680. In various embodiments, network connection 680 may encompass any suitable combination of networking hardware and protocols necessary to establish network-based communications between clients 610 and service provider network 600. For example, a network connection 680 may generally encompass the various telecommunications networks and service providers that collectively implement the Internet. A network connection 680 may also include private networks such as local area networks (LANs) or wide area networks (WANs) as well as public or private wireless networks. For example, both a client 610 and the service provider network 600 may be respectively provisioned within enterprises having their own internal networks. In such embodiments, the network connection 680 may include the hardware (e.g., modems, routers, switches, load balancers, proxy servers, etc.) and software (e.g., protocol stacks, accounting software, firewall/security software, etc.) necessary to establish a networking link between the client 610 and the Internet as well as between the Internet and service provider network 600. In some embodiments, client(s) 610 may communicate with service provider network 600 using a private network rather than the public Internet.

Provider network 600 may be set up by an entity such as a company or a public sector organization to provide one or more services (such as various types of cloud-based computing or storage) accessible via the Internet and/or other networks to clients 610. Provider network 600 may include numerous data centers hosting various resource pools, such as collections of physical and/or virtualized computer servers, storage devices, networking equipment and the like (e.g., computing system 800 described below with regard to FIG. 8), needed to implement and distribute the infrastructure and services offered by the provider network 600. In some embodiments, provider network 200 may implement a stream processing service 620, described in detail below with regard to FIG. 5, provide computing resources, such as virtual compute service 630 and storage services 640, such as object storage services, block-based storage services, data warehouse storage services, where the storage service includes a shared table 690, stream management service 650, and/or any other type of network based services 670

(which may include various other types of storage, processing, analysis, communication, event handling, visualization, and security services). Clients 610 may access these various services offered by provider network 600 via network 680. Likewise network-based services may themselves communicate and/or make use of one another to provide different services. For example, computing resources offered to clients 610 in units called "instances," such as virtual or physical compute instances or storage instances, may be implemented as data producers or data consumers for a data stream processed by stream processing service 620 and services such as storage service 640, may serve as destinations for data records in the data stream, providing virtual block storage for the compute instances.

As noted above, virtual compute service 630 may offer various compute instances to clients 610. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 630 in different embodiments, including special purpose computer servers, storage devices, network devices and the like. In some embodiments instance clients 610 or other any other user may be configured (and/or authorized) to direct network traffic to a compute instance. In various embodiments, compute instances may attach or map to one or more data volumes provided by a block-based storage service (not illustrated) in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 610 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

Storage service 640 may include various types of storage services, such as different types of storage schemes. An object-based data store may be implemented, in various embodiments, to provide highly durable storage for data objects, such as data records stored as part of a data stream managed by stream management service 620. For instance, the object-based data store may be implemented as a key-value data store, where a data object is associated with a unique key. The key for the data object is used to access or manage the data object stored in the object-based data store. Storage service 640 may also include a data warehouse, in various embodiments, to set up, operate, and scale a data warehouse in a cloud computing environment. Data warehouse clusters hosted by the data warehouse may provide an enterprise-class database query and management system that allows users to scale the clusters, such as by sending a cluster scaling request to a cluster control interface implemented by the web-service. Scaling clusters may allow users of the web service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently. Storage service 640 may include various types of database systems and other data store schemes, such as a NoSQL database or various types of relational database systems. In at least some embodiments, updates or other interactions with storage service 640 may be a source for one or multiple data streams for processing by stream processing service 620.

Stream management service 650 may provide programmatic interfaces (e.g., application programming interfaces (APIs), web pages or web sites, graphical user interfaces, or command-line tools) to enable the creation, configuration and deletion of streams. The programmatic interfaces may also enable the submission, storage, analysis, transformation and/or retrieval of streaming data records in some embodiments. Some clients of the stream management system may develop applications that directly invoke the stream management system programmatic interfaces in various embodiments. In at least some embodiments, however, in addition to the stream management system interfaces, a higher-level abstraction or application-level processing framework may be provided for customers, which may simplify various aspects of stream processing for those clients that do not wish to develop applications using the lower-level stream management functions supported by the stream management system. Such a framework may provide its own programmatic interfaces (built, for example, on top of the stream management system interfaces), enabling customers to focus more on the business logic to be implemented using stream records than on lower-level stream management operations. The higher-level framework may be implemented as part of the stream management system to provide fully managed data stream.

For example, stream management service 650 may implement a data ingestion system configured to obtain data records of a particular data stream from data producers (e.g., by operating one or multiple ingestion nodes for a data stream). In some embodiments, data records of a stream may be obtained according to a scheme for partitioning the data stream. The partitioning scheme may be selected by a client of stream management service 650 for a data stream such that data records are received from data producer(s) indicating the particular partition to which the data record belongs. However, in some embodiments, a data stream may be fully managed by stream management service 650 and data producer(s) may send data records without any direction for partitioning. Instead, the data ingestion system may assign data records to route the data records to identified partition. Once ingested, stream management service may store obtained data records (e.g., on corresponding storage nodes provisioned for a the data stream). Such storage nodes may record, save, store or otherwise persist the data records on any of various types of storage devices (which may be performed in accordance with a persistence policy for the data stream).

In order to retrieve data from the data stream, stream management service may provide a retrieval system (e.g., implementing retrieval nodes) that may access the stored data records of the data stream. In some embodiments, data retrieval may be performed in response to request from consumers (e.g., stream processing nodes that perform processing on data stream data).

Stream management service 650 may provide an interface that supports one or more sets of programmatic interfaces (e.g., application programming interfaces (APIs), web pages or web sites, graphical user interfaces, or command-line tools) to enable the creation, configuration and deletion of data streams (both client-managed or fully-managed), as well as the submission, storage and retrieval of stream data records in some embodiments. For instance, data producers may be configured to place data records into a data stream by utilizing a client library provided by stream management service 650 to utilize requests, sending a "putRecord" request to stream management service 650 via the interface. Similarly, data consumer(s) may be configured to access stream management service 650 via the interface and utilize the client library provided by stream management service 650 to "getNextRecords" when executing an application to retrieve the next data records to be processed in the data stream.

Other network-based services 660 may include various services, including services configure networking of client provider network resources (e.g., load balancing), security (e.g., firewalls, access control), communication (e.g., notification or messaging systems), event driven execution services, visualization services or services for further data processing. External data stream source(s)/destination(s) 670 may provide data streams which may be processed by stream processing service 620 and/or serve as destinations for the results generated by stream processing service 620. For instance, external data stream sources may be system that collects crowd sourced information (e.g., traffic or temperature) and assembles single data stream of the sourced data for processing to stream processing service 620. External data stream source(s)/destination(s) may be a private data store or processing system which may operate further on results reported from stream processing service 620.

Clients 610 may encompass any type of client configurable to submit requests to network provider 600. For example, a given client 610 may include a suitable version of a web browser, or may include a plug-in module or other type of code module configured to execute as an extension to or within an execution environment provided by a web browser. Alternatively, a client 610 may encompass an application such as a database application (or user interface thereof), a media application, an office application or any other application that may make use of compute instances, a data volume, or other network-based service in provider network 600 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 610 may be configured to generate network-based services requests according to a Representational State Transfer (REST)-style network-based services architecture, a document- or message-based network-based services architecture, or another suitable network-based services architecture. In some embodiments, a client 610 (e.g., a computational client) may be configured to provide access to a compute instance or data volume in a manner that is transparent to applications implement on the client 610 utilizing computational resources provided by the compute instance or block storage provided by the data volume.

Clients 610 may convey network-based services requests to provider network 600 via external network 660. In various embodiments, external network 680 may encompass any suitable combination of networking hardware and protocols necessary to establish network-based communications between clients 610 and provider network 600. For example, a network 280 may generally encompass the various telecommunications networks and service providers that collectively implement the Internet. A network 680 may also include private networks such as local area networks (LANs) or wide area networks (WANs) as well as public or private wireless networks. For example, both a given client 610 and provider network 600 may be respectively provisioned within enterprises having their own internal networks. In such an embodiment, a network 680 may include the hardware (e.g., modems, routers, switches, load balancers, proxy servers, etc.) and software (e.g., protocol stacks, accounting software, firewall/security software, etc.) necessary to establish a networking link between given client 610 and the Internet as well as between the Internet and provider network 600. It is noted that in some embodiments, clients 610 may communicate with provider network 600 using a private network rather than the public Internet.

The clients 610 may encompass any type of client configurable to submit services requests to a network-based storage service 640 via network 680. In some embodiments, the storage service 640 may not be a network-based storage service, but rather be accessed by a client 610 in the same computer. In some embodiments, a given client 610 may include a suitable version of a web browser or a plug-in module for a web browser, or other type of code module configured to execute as an extension to or within an execution environment to provide database or data storage service clients (e.g., client applications, users, and/or subscribers) access to the services provided by storage service 130. Alternatively, a client 610 may encompass an application such as a database application, media application, office application or any other application that may make use of persistent storage resources. In some embodiments, an application may include sufficient protocol support (e.g., for a suitable version of Hypertext Transfer Protocol (HTTP)) for generating and processing web services requests without necessarily implementing full browser support for all types of web-based data. A client 610 may be an application configured to interact directly with the storage service 640. In some embodiments, a client 610 may be configured to generate web service requests according to a Representational State Transfer (REST)-style web services architecture, a document- or message-based web services architecture, or another suitable web services architecture.

In some embodiments, client 610 may be configured to provide access to storage service 640 to other applications in a manner that is transparent to those applications. For example, a client 610 may be configured to integrate with an operating system or file system to provide storage in accordance with a suitable variant of the storage model described herein. In some embodiments, the operating system or file system may present a different storage interface to applications, such as a conventional file system hierarchy of files, directories and/or folders. In some embodiments, applications may not need to be modified to make use of the storage system service model described herein. Instead, the details of interfacing to storage service 640 may be coordinated by the client 610 and the operating system or file system on behalf of applications executing within the operating system environment.

In some embodiments, the storage service 640 may be configured to implement one or more service endpoints configured to receive and process service requests, such as requests to access tables 690 maintained on behalf of clients/users by storage service 640, and/or the items and attributes stored in those tables 690. For example, storage service 640 may include hardware and/or software configured to implement various service endpoints and to properly receive and process HTTP-based web services requests directed to those endpoints. In one embodiment, storage service 640 may be implemented as a server system configured to receive web services requests from clients 610 and to forward them to various components that collectively implement a data storage system for processing. In some embodiments, storage service 640 may be configured as a number of distinct systems (e.g., in a cluster topology) implementing load balancing and other request management features configured to dynamically manage large-scale web services request processing loads.

The storage service 640 may include a dispatcher (which may be configured to receive, authenticate, parse, throttle and/or dispatch service requests, among other things), one or more administrative components, or auto admin instances (which may be configured to provide a variety of visibility and/or control functions, as described in more detail herein) which may be implemented as part of a frontend. Storage service 640 may also implement a plurality of storage node instances, each of which may maintain and manage one or more tables 690 and/or indexes on behalf of clients/users or on behalf of the storage service itself, as part of a backend. Some of the functionality provided by each of these types of components is described in more detail herein, according to various embodiments. Note that in some embodiments, storage service 640 may include different versions of some of the components illustrated in the figure to provide functionality for creating, accessing, and/or managing tables 690 and/or indexes maintained in database instances within a single-tenant environment than those that provide functionality for creating, accessing, and/or managing tables and/or indexes maintained in database instances within a multi-tenant environment. In some embodiments, functionality to support both multi-tenant and single-tenant environments may be included in any or all of the components illustrated in the figure. In some embodiments, one or more database instances may be implemented on each of the storage nodes, and each may store tables and/or indexes on behalf of clients 610. Some of these database instances may operate as if they were in a multi-tenant environment, and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

In various embodiments, the components illustrated in the figure may be implemented directly within computer hardware, as instructions directly or indirectly executable by computer hardware (e.g., a microprocessor or computer system), or using a combination of these techniques. For example, the components of the storage service 640 may be implemented by a distributed system including a number of computing nodes (or simply, nodes), such as computing systems described below. In some embodiments, the functionality of a given storage service system component may be implemented by a particular computing node or may be distributed across several computing nodes. In some embodiments, a given computing node may implement the functionality of more than one storage service system component.

In various embodiments, storage service 640 may be configured to support different types of service requests. For example, in some embodiments, storage service 640 may be configured to implement a particular web services application programming interface (API) that supports a variety of operations on tables or indexes, or other data objects, that are maintained and managed on behalf of clients/users by the data storage service system.

The APIs provided by the storage service 640 may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

In some embodiments, the control plane APIs supported by the storage service 640 may include APIs that perform updates on tables 690 (e.g., a CreateTable API and/or a DeleteTable API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table of index configurations or parameters, e.g., an UpdateTable API (which may be used to increase the provisioned throughput capacity for a given table), a PurchaseTableCapacity API (which may be used to increase the provisioned storage capacity for a given table or index), a SplitTable API (which may be used to explicitly invoke an operation to split a table or index or any of its partitions), or a MoveTable API (which may be used to explicitly invoke an operation to move one or more tables or indexes, partitions of a table, or partition replicas of a table).

In some embodiments, the storage service 640 may provide an application programming interface (API) that includes support for some or all of the following operations on data maintained in a table by the service on behalf of a storage service client: put (or store) an item, get (or retrieve) one or more items having a specified primary key or partition key, delete an item, update the attributes in a single item, query for items using an index, and scan (e.g., list items) over the whole table, optionally filtering the items returned. For example, the storage service 640 may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API.

In addition to functioning as an endpoint for clients' service requests, in some embodiments the storage service 640 may implement various client management features. For example, storage service 640 may coordinate the metering and accounting of client usage of services, including storage resources, by tracking the identities of requesting clients 610, the number and/or frequency of client requests, the size of tables and/or items stored or retrieved on behalf of clients 610, overall storage bandwidth used by clients 610, class of storage requested by clients 610, and/or any other measurable client usage parameter. The storage service 640 may also implement financial accounting and billing systems, or may maintain a database of usage data that may be queried and processed by external systems for reporting and billing of client usage activity. In some embodiments, the storage service 640 may include a lock manager and/or a bootstrap configuration (not shown).

In some embodiments, the storage service 640 may provide an application programming interface (API) that includes support for some or all of the following operations on the data in a table or index maintained by the service on behalf of a storage service client: put (or store) an item, get (or retrieve) one or more items having a specified primary key, delete an item, update the attributes in a single item, query for items using an index, scan (e.g., list items) over the whole table, and/or optionally filtering the items returned. In some embodiments, the API may also include support to create one or more secondary indexes global to a table which may be used to perform different queries efficiently over particular attributes in the table that are used to create the secondary index. In some embodiments, the secondary indexes may store the same logical items as the associated table, but stored differently. For example, items in the secondary indexes may be stored in a different sort order from the table (using a different sort key), or in a different set of partitions as the table (using a different partition key). As another example, items in the secondary indexes may include only a subset of attributes stored in the associated table. In some embodiments, inserts or deletes from the table may automatically trigger inserts or deletes in the indexes associated with the table.

In some embodiments, the API of the storage service 640 may provide support to create one or more auto-partitioning secondary indexes for a table. As discussed in further detail below, the APSI may create its own partition keys and manage its own partitions, without relying on any user attribute in the index. The APSI may be created with the table, or created by a separate operation after the creation of the table. In some embodiments, the API may also support an operation to describe the metadata of a table or an index. In some embodiments, the API may support, for an APSI, an explicit user operation to repartition the APSI.

In some embodiments, the storage service 640 and/or the underlying system that implements the service may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

In some embodiments, a partition replica may be assigned to a particular storage node based largely (or solely) on whether there is enough storage capacity for the anticipated size of the table. For example, the anticipated size may be based on information included in a request to create the table or index, on usage history for the client on whose behalf the table or index was created, or on a history of accesses that target the table or index, the partition, or the replica itself (e.g., if this is a partition replica that is being reassigned as part of a move operation). In such embodiments, there may or may not be enough throughput capacity for the partition replica on the selected storage node (or storage device thereof). For example, a disk to which the partition replica is assigned may be oversubscribed in terms of IOPS, the actual number of TOPS may be more than was expected, or the provisioned (or committed) number of IOPS may have grown after the partition replica was created (e.g., using an UpdateTable operation to increase the provisioned throughput capacity for read operations and/or write operations). In some embodiments, an UpdateTable operation may be invoked by a client through a graphical user interface (GUI). In other embodiments, an UpdateTable operation may be invoked through an UpdateTable API whose inputs include an identifier of the table for which additional throughput capacity is desired, a desired (e.g., increased) number of IOPS for read operations and/or a desired (e.g., increased) number of IOPS for write operations. In some or all of these cases, the partition replica may need to be moved to another storage node (or storage device) or split into two new (smaller) partitions, each of which may be hosted on a different storage device (or storage node).

In some embodiments, the storage service 640 may be implemented on one or more computing nodes that are configured to perform the functionality described herein. In some embodiments, the service may be implemented by a network-based storage service that is made up of multiple computing nodes, each of which may perform one or more of the functions described herein. Various collections of the computing nodes may be configured to provide the functionality of an auto-admin cluster, a cluster of resources dedicated to the storage service, and a collection of external resources (which may be shared with other network-based services or applications, in some embodiments).

In some embodiments, the storage service 640 may support seamless scaling of user tables or indexes in a "fully shared nothing" type architecture. For example, in some embodiments, each table 690 or index partition may be implemented as a completely independent parallel computation unit. In such embodiments, the system may provide minimal distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/automatic or explicitly initiated) may be employed to adapt to workload changes. In other words, in some embodiments, repartitioning (including partition moving, partition splitting, and/or other partition management operations) may be performed while service requests directed to the affected partitions continue to be received and processed (i.e. without taking the source partition off-line).

In some embodiments, the storage service 640 and/or underlying system may support a variety of service offerings and/or throughput models. In some embodiments, the storage service 640 may support a committed work throughput offering and/or a best effort offering. In some embodiments, a committed work throughput level may be specified in terms of a measure of normalized, logical work units (or logical service request units) over time, and may represent a work throughput level that is guaranteed by the system. For example, for the storage service 640 (e.g., for particular tables or indexes maintained on behalf of clients), a client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table or index through a parameter of a request to create the table or index, in some embodiments. In some embodiments, a client/user may specify a default throughput model for all tables or indexes created and maintained on their behalf by the storage service 640. By supporting both a committed throughput model and a best effort throughput model (for which no throughput guarantees are made), the storage service 640 may allow clients/users to make a trade-off between performance and cost, according to their needs and/or budgets. Other types of services may support a committed work throughput model and/or other throughput models.

The storage service 640 and/or underlying system that provides a committed throughput offering may be configured to pre-allocate capacity and/or resources for the creation, growth, and management of a table or index maintained on behalf of a client 610 in response to traffic directed to the table or index, and not to overbook the resources and/or capacity of the storage node(s) on which that table or index is maintained. In some embodiments, tables or indexes maintained by the storage service 640 and underlying system under a committed throughput model may be maintained in faster (and often more expensive) storage resources, such as high performance media (e.g., flash memory or Solid State Drive, or SSD, media), in order to provide extremely low latencies when servicing requests from the client 610. For example, the storage service 640 may provide or dedicate a high ratio of fast/local memory to main (e.g., disk) memory for the maintenance of those tables and various partitions thereof. In some embodiments, while the storage resources allocated to a given table or index under a committed throughput model may in some cases be underutilized (at least some of the time), the client 610 may value the predictable performance afforded by the committed throughput model more than the additional (and in some cases wasted) costs of dedicating more resources than may always be necessary for the table or index. Similarly, resources that are pre-allocated to other types of services to support a committed work throughput model may in some cases be underutilized (at least some of the time), but may provide the client 610 with a predictable level of performance (e.g., in terms of availability and/or responsiveness).

Figure 7:
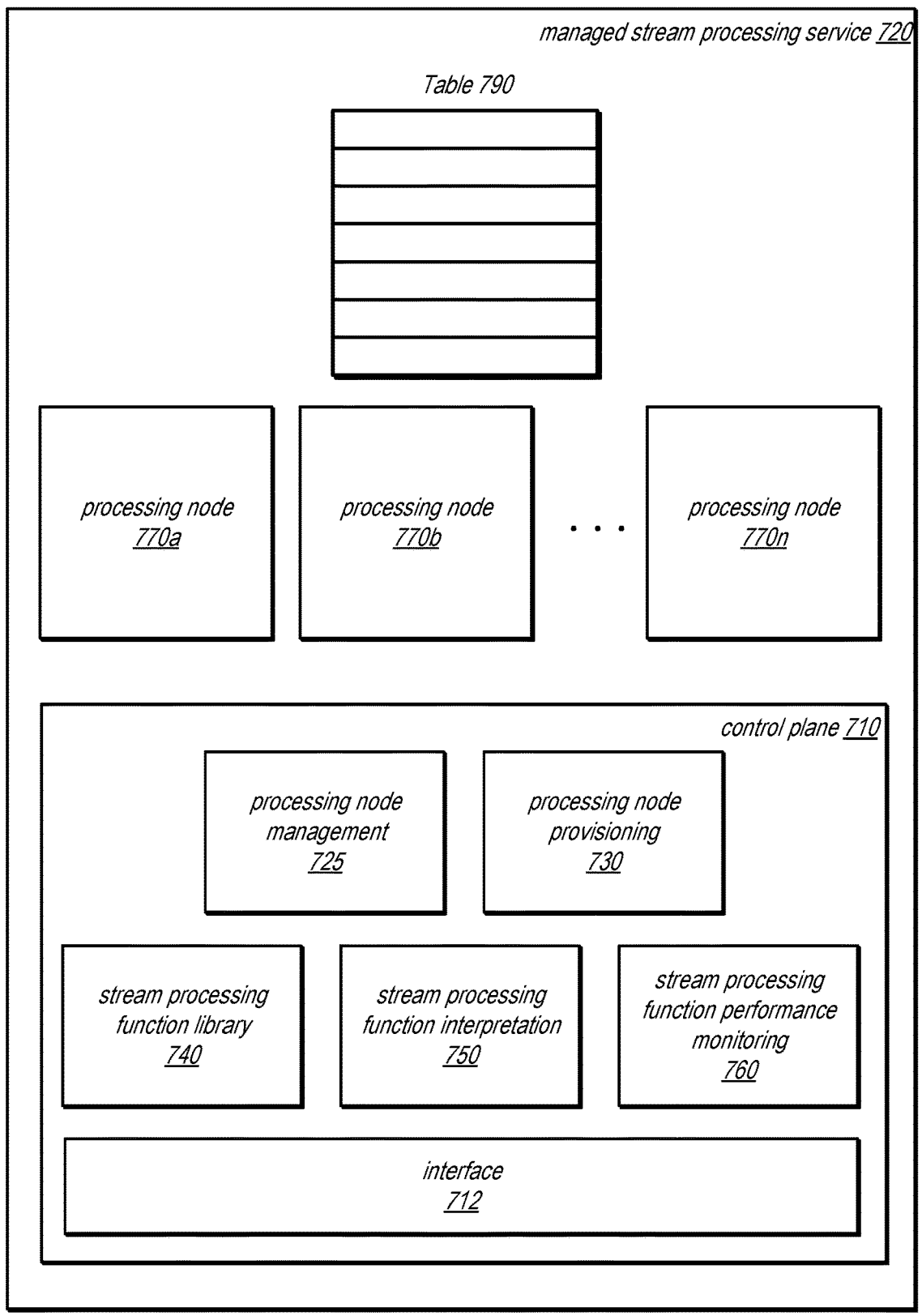
FIG. 7 is a logical block diagram of a stream processing service that implements dynamically switching between query and scan for optimizing table reads, according to at least some embodiments.

FIG. 7 is a logical block diagram of a stream processing service that implements dynamically switching between query and scan for optimizing table reads, according to at least some embodiments. Managed stream processing service 720 may receive stream processing functions via interface 712 and provision one or more processing nodes 770 from a pool of processing nodes 770 to execute the stream processing function. As illustrated in FIG. 7, managed stream processing service 720 may implement control plane 710 to manage the execution of stream processing functions at stream processing nodes 770. The managed stream processing service 720 may also include a table 790 that may be shared among the processing nodes 770 to coordinate the processing of the streams, in some embodiments.

In various embodiments, control plane 710 may implement interface 712 which may be a programmatic interface invoked by various calls or interactions by clients of managed stream processing service 720. For instance, as discussed below with regard to FIG. 7, a client may send a request to create a stream processing application that includes a stream processing function. This request may be formatted according to an API call (e.g., "createStreamProcessor") and may include as parameters of the call one or more operations to perform with respect to the data stream (e.g. query, add, remove, transform, aggregate, calculate, etc.), input data streams (e.g., data stream names, network addresses, or other identification information), and result destinations (e.g., data store names, network addresses or other identification/connection information. Interface 712 may be invoked by a command line interface or may be implemented as part of a graphical user interface. Interface 712 may also provide for the uploading of stream processing functions (e.g., written in a coding language or provided as an executable or other object that may perform stream processing function).

In at least some embodiments, control plane 710 may implement stream processing function interpretation 750. Stream processing interpretation 750 may provide various libraries, compilers, or any other kind of interpreter that may receive a stream processing function (e.g., operations, input data streams, destinations, etc.) and generate an executable form (e.g., object code, byte code, workflow, or other set of instructions). For example, in some embodiments, processing nodes 770 may implement a common execution engine so that stream processing functioning interpretation 750 may provide an executable that can run on any available processing node. In some embodiments, stream processing function interpretation 750 may validate received stream processing functions for errors (e.g., same input and result destination), leaving interpretation and execution to other components, such as execution engines located at processing nodes 770. In various embodiments, stream processing function 750 may evaluate input data streams to determine a data scheme for the execution of a stream processing function. For instance, stream processing function interpretation may access and analyze a group of data records to determine a schema for the data stream, including labeling or identifying common or expected attributes in data records, which may be provided back to a client via interface 712.

In at least some embodiments, control plane 710 may implement a stream processing function library 740 which may provide a collection of common and/or user submitted stream processing functions (or individual operations for stream processing functions). For example, stream processing functions to filter, aggregate, or generate a rolling average may be stored as part of stream processing function library 740. A client may select a stream processing function from the library and adapt or customize it for execution (e.g., supply input data stream information, result destinations, etc.) via interface 712. In this way, stream processing function library 740 may maintain stream processing functions that are common may be easily adapted for different stream processing applications.

Processing node provisioning 730 may be implemented as part of control plane 710, in various embodiments, in order to provision processing nodes for received stream processing functions. In at least some embodiments, processing node provisioning 730 may perform a preliminary analysis to determine the processing requirements or configuration for a stream processing function. If, for instance, multiple data input streams are indicated, then processing node provisioning 730 may determine whether one or multiple processing nodes 770 may need to be acquired in order to execute the stream processing function. If multiples stream processing nodes may be determined, then processing node provisioning 730 may determine a mapping scheme to distribute data amongst the processing nodes 770 and reconstitute or aggregate results from individual processing nodes 770 for reporting. Processing node provisioning may, as noted above, identify required performance characteristics or other stream processing function requirements and obtain and select the appropriate processing nodes.

Once processing nodes 770 are selected, processing node provisioning 730 may configure or obtain the appropriate access credentials to provide the processing nodes 770 with access to the input data streams and result destinations. For instance, if security credentials are required, then processing node provisioning may parse information supplied by a client to managed stream processing service when the stream processing function was submitted in order to extract the security credentials for providing process nodes 770 with access. Processing node provisioning 730 may provide the operation(s) and other information to processing nodes 770 in order to initiate execution of the stream processing function (e.g., by providing a SQL statement, executable, or other instructions for applying the stream processing function), which in some embodiments may be generated by stream processing function interpretation 750.

In various embodiments, control plane 710 may implement processing node management 725 to manage the execution of stream processing functions at processing nodes 770. For instance, based on performance metrics received via stream processing function performance monitoring 760, such as metrics that indicate processing utilization, network utilization, memory utilization, or any other computational performance metric, may indicate that a processing node 770 is unable to keep up with the stream of data records received (e.g., by measuring result output rates, memory utilization, ingress buffers for network packets, etc.). Processing node management 725 may request another processing node 770 from processing node provisioning 730 in order to split the workload for the one processing node among 2 (or more) processing nodes. Various other management functions, such as migrating a stream processing function from one process node to another, changing mappings for partitioned data streams, or any other real time changes in configuration to the execution of a stream processing query may be performed by processing node management 725. In some embodiments, clients may submit reconfiguration requests to control plane 710 to change the execution configuration of data streams (e.g., change the number of processing nodes for a stream processing query).

In some embodiments, control plane 710 may implement stream processing function performance monitoring 760. Performance monitoring 760 may be implemented in order to provide feedback to processing node management 725 and/or clients of managed stream processing service 720. For instance, a function performance report, such as discussed below with regard to FIG. 7 may be generated and sent via interface 712 by performance monitoring 760.

Managed stream processing service 720 may implement a pool of stream processing nodes 770*a* through 770*n* which may be implemented on dedicated hardware hosts (e.g., such as computing system 800 in FIG. 8 below) or may be implemented as virtual instances (e.g., by provisioning compute instances of computing service 430 in FIG. 4). Stream processing node 770 may retrieve data records for data streams in order to apply a stream processing function (or assigned portion/operation of stream processing function) and deliver results generated by applying the stream processing function to a specified destination.

Figure 8:
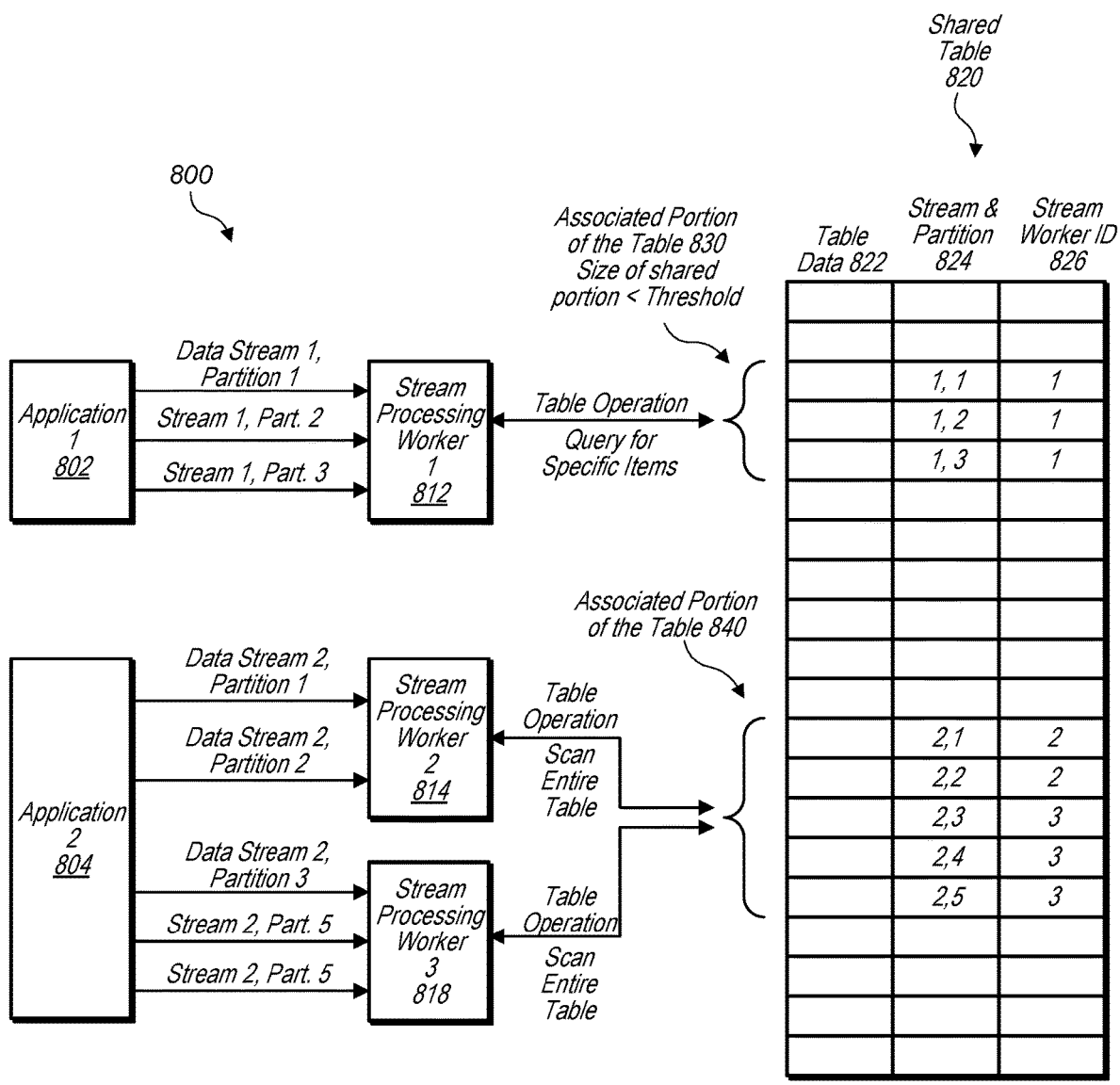
FIG. 8 illustrates a data stream processing system that comprises multiple stream processing workers performing table operations on associated portions of a shared table, where stream processing worker 1 performs queries instead of a scan, according to some embodiments.

FIG. 8 illustrates a data stream processing system that comprises multiple stream processing workers performing table operations on associated portions of a shared table, where stream processing worker 1 performs queries instead of a scan, according to some embodiments. In the embodiments disclosed in FIG. 8, stream processing worker 1 812 is the only stream processing worker for application 1 802. Application 2 804, however, is associated with two stream processing workers, stream processing worker 2 814, and stream processing worker 3 818. Stream processing worker 1 812 operates on an associated portion 830 of the shared table 820. Stream processing workers 2 and 3, 814 and 818, operate on a different associated portion 840 of the shared table 820. The associated portions of the shared table, 830 and 840, can comprise multiple entries of the shared table 820. While the associated portions, 830 and 840, are depicted as being contiguous entries, this is only for ease of presenting the figure. The associated portions, 830 and 840, can comprise non-contiguous table entries, in some embodiments, such that the entries are spread throughout the shared table, and are not a block of entries in one section of the shared table as depicted in FIG. 8. The associated portions of the shared table, 830 and 840, might be exclusive of one another, such that no entries in one associated portion appear in the other associated portion, in some embodiments. In other embodiments the associated portions of the shared table 830 and 840 might include some entries in common.

Each client 812, 814, and 818 that is accessing the shared table is only be concerned with specific entries in the shared table, based on the data in the shared table, in some embodiments. Stream processing worker 1 812 processing a data stream for application 1 802 is only concerned with the entries in associated portion of the shared table 830. Stream processing workers 814 and 818, processing a data stream for application 2 804, are only concerned with the entries in the associated portion of the shared table 840. In the figure, stream processing worker 1 has determined that querying the shared table is more appropriate than scanning the shared table. Therefore, stream processing worker 1 812 queries the shared table 820 only for those specific relevant entries in its associated portion of the shared table 830. Stream processing worker 1 812 can use the information in its internal memory or cache, for example, so that the specific entry in the shared table can be quickly found, in some embodiments.

Stream processing worker 1 812 has decided to query the shared table for those specific relevant entries in its associated portion of the shared table 830, instead of scanning the entire shared table 820. Stream processing worker 1 812 has determined that no other client is associated with the entries in its associated portion of the shared table 830. In the embodiments shown in this figure, the client might be determining whether fewer than a threshold number of clients are accessing its associated portion of the shared table 830, where the threshold number is 2. This is the same as the client determining that less than or equal to a threshold number of clients are accessing its associated portion of the shared table 830, where the threshold number is 1.

Stream processing worker 1 has also determined that the number of entries in its associated portion 830 of the shared table is less than a certain portion size threshold. This amount or quantity of relevant entries might be in comparison to the size of the shared table as a whole, in some embodiments. For example, stream processing worker 1 might have determined that the percentage of entries in its associated portion 830, as compared to the entries in the shared table 820 as a whole is such that querying those entries is less expensive or costly in terms of computing resources consumed, than scanning the entire shared table, in some embodiments. For example, stream processing worker 1 might have determined that the IOPS of scanning the entire shared table and compared that to the IOPS of querying each relevant entry in the shared table, and decided to implement querying the shared table, since that produces the lower amount of IOPS. Else stream processing worker 1 might simply have a pre-set threshold, such that if the number of relevant entries is less than the threshold, then stream processing worker 1 will query the shared table for those entries, instead of scanning the entire shared table, in the future. Or stream processing worker 1 might have a pre-set percentage, such that if the percentage of entries in the associated portion to the total entries of the shared table is less than a certain percentage, then stream processing worker 1 would query the shared table for those entries, instead of scanning the entire shared table, in the future. There can be many other kinds of methods or criteria used where stream processing worker 1 basically determines the size, or another related parameter, of its associated portion of the shared table 830. The examples described here should not be construed as limiting.

Stream processing workers 2 and 3, 814 and 818, have each determined that there is another stream processing worker associated with, or accessing, the portion 840 of the shared table associated with itself, in the embodiments depicted by FIG. 8. In the embodiments shown in this figure, a threshold value of clients accessing the portion 840 would be either less than 2 or less than or equal to 1 (both of which are the same). Based on this determination, each stream processing worker has decided to scan the entire shared table 820, instead of querying for individual entries in its associated portion 840 of the shared table, in these depicted embodiments. It does not matter if the size of the associated portion 840 of the shared table is greater than or less than a portion size threshold, in these embodiments, since the criteria of being the only stream processing worker accessing the associated portion was not satisfied. Since this criteria of being the only stream processing worker accessing the associated portion 840 of the shared table is not satisfied for the nodes processing data streams for application 2 804, the size of the associated portion 840 becomes irrelevant to the determination of whether to query or scan, in these embodiments.

The shared table 820 comprises at least three sets of data, noted as three separate columns in FIG. 8. These columns are the table data column or columns 822, the stream and partition column 824, and the stream worker identification column 826. The stream and partition entry or entries in the shared table note the data stream and the partition of that data stream that the entry in the shared table corresponds to. The client identification column 826 notes the stream processing worker identification of the stream processing worker assigned or associated with that entry. For example, all of the entries in the client identification column 826 for the associated portion 830 of the shared table 820 are for stream processing worker 1 812. As another example shown in FIG. 8, the data streams and partitions that are being processed by stream processing worker 2 814 are noted with a "2" in the stream worker identification column 826 of shared table 820, and the data streams and partitions that are being processed by stream processing worker 3 818 are noted with a "3" in the stream worker identification column 826 of shared table 820. When stream processing worker 1 queries the shared table 820 for the entries in its associated portion 830, it will determine that it is the only stream processing worker processing partitions of data streams for application 1 802. When stream processing workers 2 and 3, 814 and 818, scan the shared table 820, they will determine that there is another stream processing worker besides themselves processing partitions of the data stream 2 for application 2 804.

Figure 9:
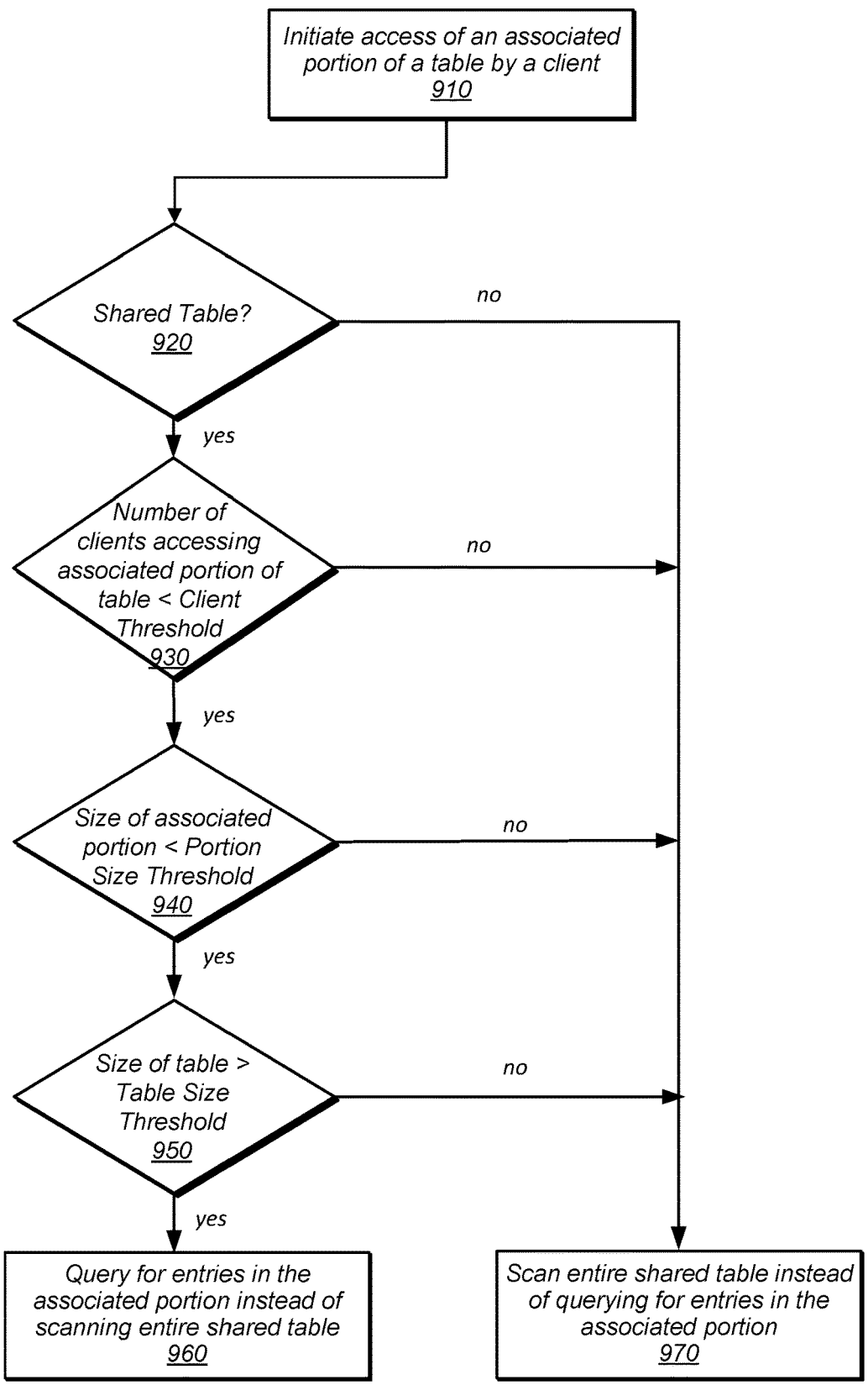
FIG. 9 illustrates is a flowchart of a method by which a client might decide whether to initiate a scan of a table or a query for specific entries in the shared table, according to at least some embodiments.

Flow Diagram for Dynamically Switching Between Query and Scan for Optimizing Table Reads FIG. 9 illustrates is a flowchart of a method by which a client might decide whether to initiate a scan of a shared table or a query for specific entries in the shared table, according to at least some embodiments. The flow diagram starts in block 910, where a client or a stream processing node decides to initiate access to an associated portion of a shared table. The flow diagram transitions to block 920, where a determination is made as to whether the table is a shared table. If the table is not a shared table, then the flow diagram transitions to block 970 where the client or stream processing worker scans the shared table instead of querying for entries in the associated portion of the shared table. If, however, at block 920, the client determines that the table is a shared table, then the flow diagram transitions to block 930.

At block 930, a determination is made as to whether the number clients that are accessing the associated portion of the shared table is less than a client threshold. If the number clients that are accessing the associated portion of the shared table is not less than a client threshold, then the flow diagram transitions to block 970 where the client or stream processing worker scans the shared table instead of querying for entries in the associated portion of the shared table. If, however, at block 930, the client determines that the number clients that are accessing the associated portion of the shared table is less than a client threshold, then the flow diagram transitions to block 940.

At block 940, a determination is made as to whether the size of the associated portion is less than a threshold. If the size is not less than a threshold, then the flow diagram transitions to block 970 where the client or stream processing worker scans the shared table instead of querying for entries in the associated portion of the shared table. If, however, at block 940, the client determines that the size of the associated portion is less than a threshold, then the flow diagram transitions to block 950.

At block 950, a determination is made as to whether the size of the shared table is greater than a table threshold. If the size is not greater than a table threshold, then the flow diagram transitions to block 970 where the client or stream processing worker scans the shared table instead of querying for entries in the associated portion of the shared table. If, however, at block 950, the client determines that the size of the shared table is greater than a threshold, then the flow diagram transitions to block 960 where the client or stream processing worker queries for entries in the associated portion of the shared table instead of scanning the entire shared table.

Not all of the decisions in blocks 920, 930, 940, and 950 may be implemented in a given embodiment. In some embodiments, only the decisions of 930 and 940 are implemented, such that if the client or stream processing worker determines that the number clients that are accessing the associated portion of the shared table is less than a client threshold, and that the size of the associated portion is less than some threshold, then the system immediately transitions to block 960 and queries for entries in the associated portion of the shared table instead of scanning the entire shared table, effectively skipping over steps 920 and 950. In other embodiments other combinations of blocks 920, 930, and 950 might be implemented, such that if the decision in those blocks leads to block 960, then block 960 is implemented, effectively skipping over those decision blocks that are not implemented in the given embodiment. Any combination of one or more decision blocks 920, 930, 940, and 950 might be implemented in any given embodiment.

Illustrative System

Figure 10:
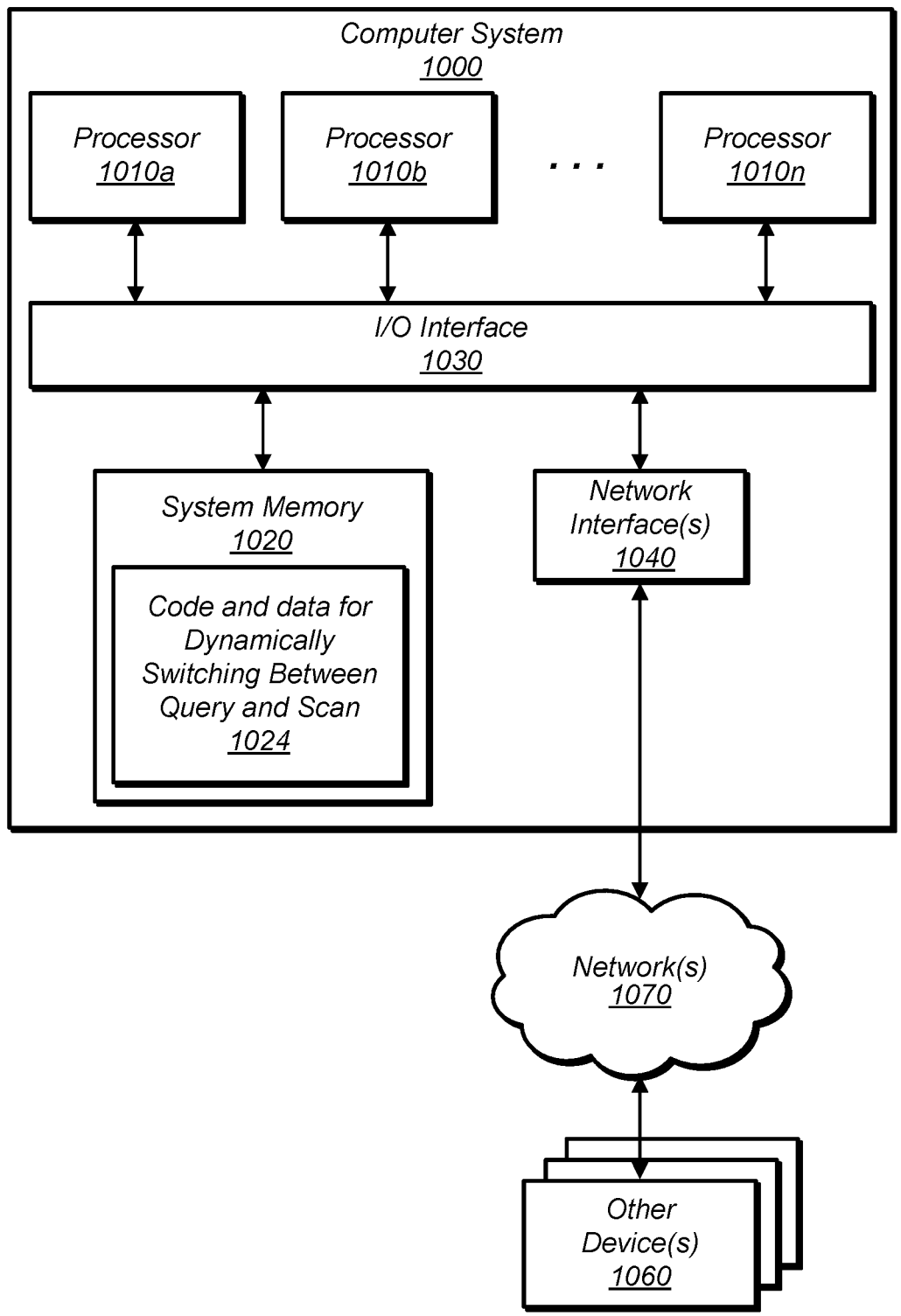
FIG. 10 is a block diagram illustrating an example computer system that may be used in some embodiments.

In at least some embodiments, a computer that implements a portion or all of the methods and apparatus for dynamically switching between query and scan for optimizing table reads as described herein may include a general-purpose computer system or computing device that includes or is configured to access one or more computer-accessible media, such as computer system 1000 illustrated in FIG. 10. FIG. 10 is a block diagram illustrating an example computer system that may be used in some embodiments. This computer system can be used as a client node in FIGS. 1, 2, and 3, for example, or as a resource host in one of the services in the provider network 600, such as the virtual compute service 630, stream processing service 620, storage service 640, stream management service 650, or other network-based services 660, or as one or more of the plurality of processing nodes 770 in the managed stream processing service 720, for example. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for dynamically switching between query and scan for optimizing table reads, are shown stored within system memory 1020 as the code and data for dynamically switching between query and scan 1024.

In one embodiment, I/O interface 1030 may be configured to coordinate I/O traffic between processor 910, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1070, such as other computer systems or devices as illustrated in FIGS. 1 through 6, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 7 for implementing apparatuses and methods for dynamically switching between query and scan for optimizing table reads. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more client sets, each client set comprising one or more client nodes of a plurality of client nodes, wherein each client node comprises at least one processor and memory;
   one or more storage nodes configured to store a shared table, wherein individual ones of the one or more client sets correspond to particular portions of the shared table, wherein the one or more storage nodes are configured to respond to both a scan operation of the entire shared table, and a query operation for specific entries in the shared table, and wherein the scan operation and the query operation are initiated by a client node of the plurality of client nodes; and
   at least one client node of a particular client set, where the particular client set corresponds a particular portion of the shared table, configured to:
      determine whether fewer than a threshold number of client nodes are accessing the particular portion of the shared table;
      select between the query operation and the scan operation to access the shared table, wherein the selecting is based at least in part on a result of the determining, and wherein the query operation is selected when fewer than the threshold number of client nodes are determined to be accessing the particular portion of the shared table; and
      initiate, subsequent to selecting the query operation, the query operation for one or more specific entries in the particular portion of the shared table.

2. The system of claim 1, wherein the at least one client node is further configured to:
   determine that more than a threshold number of client nodes are accessing the particular portion of the shared table;
   based at least in part on the determination that more than a threshold number of client nodes are accessing the particular portion of the shared table, select and initiate the scan operation of the entire shared table.

3. The system of claim 1, wherein before initiating the query operation for the one or more specific entries in the particular portion of the shared table, the at least one client node is further configured to:
   determine that a size of the particular portion of the shared table is less than a portion size threshold.

4. The system of claim 3, wherein the at least one client node is further configured to:
   determine the size of the particular portion of the shared table is greater than the portion size threshold;
   based at least in part on the determination that the size of the particular portion of the shared table is greater than the portion size threshold, select and initiate the scan operation of the entire shared table.

5. The system if claim 3, wherein the portion size threshold is computed based upon at least a comparison of a quantity of input/output operations per second ("TOPS") to perform the scan operation of the entire shared table to a quantity of IOPS to perform the one or more query operations for specific entries in the shared table.

6. A method, comprising:
   identifying, by a client comprising at least one processor and memory, whether fewer than a threshold number of clients are accessing a particular portion of a shared table accessible by a plurality of clients;
   selecting, by the client, between a query operation and a scan operation to access the shared table, wherein the selecting is based at least in part on a result of the identifying, and wherein the query operation is selected when fewer than the threshold number of clients are identified to be accessing the particular portion of the shared table; and
   initiating, by the client subsequent to selecting the query operation, the query operation for one or more specific entries in the particular portion of the shared table.

7. The method as recited in claim 6, further comprising:
   identifying that more than a threshold number of clients are accessing the particular portion of the shared table;
   based at least in part on the identifying that more than a threshold number of clients are accessing the particular portion of the shared table, selecting and initiating the scan operation of the entire shared table.

8. The method of claim 6, wherein before initiating the query operation for the one or more specific entries in the particular portion of the shared table, the method further comprises:
   identifying that a size of the particular portion of the shared table is less than a portion size threshold.

9. The system of claim 8, further comprising:
   identifying that the size of the particular portion of the shared table is greater than the portion size threshold;
   based at least in part on identifying that the size of the particular portion of the shared table is greater than the portion size threshold, selecting and initiating the scan operation of the entire shared table.

10. The method if claim 8, wherein before identifying that the size of the particular portion of the shared table is less than the portion size threshold, the method further comprises:
- computing the portion size threshold based at least in part upon a comparison of a quantity of input/output operations per second ("TOPS") to perform the scan operation of the entire shared table to a quantity of IOPS to perform the query operation for the one or more specific entries in the particular portion of the shared table.

11. The method as recited in claim 6, wherein a client set comprises one or more clients of the plurality of clients including the client, wherein the client set corresponds to the particular portion of the shared table, wherein other clients that do not comprise the client set correspond to other portions of the shared table, and wherein each client in the client set processes data records for different partitions of a same data stream of a plurality of data streams.

12. The method as recited in claim 11, wherein each data stream of the plurality of data streams comprises at least one partition, and wherein individual clients of the plurality of clients process the data records for one or more partitions of at least one data stream of the plurality of data streams.

13. The method as recited in claim 12, wherein data in the shared table comprises information corresponding a respective partition of the same data stream to a respective client of the client set that is processing the data records for the respective partition.

14. One or more non-transitory computer-readable storage media storing program instructions that when executed on or across one or more processors of a client, cause the one or more processors to:
- identify whether fewer than a threshold number of clients are accessing a particular portion of a shared table accessible by a plurality of clients;
- select between a query operation and a scan operation to access the shared table, wherein the selecting is based at least in part on a result of the identifying, and wherein the query operation is selected when fewer than the threshold number of clients are identified to be accessing the particular portion of the shared table; and
- initiate, subsequent to selecting the query operation, the query operation for one or more specific entries in the particular portion of the shared table.

15. The one or more non-transitory computer-readable storage media of claim 14, wherein the program instructions cause the one or more processors of the client to further perform:
- identify that more than a threshold number of clients are accessing the particular portion of the shared table;
- based at least in part on the identifying that more than a threshold number of clients are accessing the particular portion of the shared table, select and initiate the scan operation of the entire shared table.

16. The one or more non-transitory computer-readable storage media of claim 14, wherein before initiating the query operation for the one or more specific entries in the particular portion of the shared table, the program instructions cause the one or more processors of the client to further perform:
- identify that a size of the particular portion of the shared table is less than a portion size threshold.

17. The one or more non-transitory computer-readable storage media of claim 16, wherein the program instructions cause the one or more processors of the client to further perform:
- identify that the size of the particular portion of the shared table is greater than the portion size threshold;
- based at least in part on identifying that the size of the particular portion of the shared table is greater than the portion size threshold, select and initiate the scan operation of the entire shared table.

18. The one or more non-transitory computer-readable storage media of claim 16, wherein, prior to identifying that the size of the particular portion of the shared table is less than the portion size threshold, the program instructions cause the one or more processors of the client to further perform:
- compute the portion size threshold based at least in part upon a comparison of a quantity of input/output operations per second ("TOPS") to perform the scan operation of the entire shared table to a quantity of IOPS to perform the query operation for the one or more specific entries in the particular portion of the shared table.

19. The one or more non-transitory computer-readable storage media of claim 14, wherein a client set comprises one or more clients of the plurality of clients including the client, wherein the client set corresponds to the particular portion of the shared table, wherein other clients that do not comprise the client set correspond to other portions of the shared table, and wherein each client in the client set processes data records for different partitions of the same data stream of a plurality of data streams.

20. The one or more non-transitory computer-readable storage media of claim 19, wherein data in the shared table comprises information corresponding a respective partition of the same data stream to a respective client of the client set processing data records for the respective partition.

* * * * *